United States Patent
Seo

(10) Patent No.: US 9,864,567 B2
(45) Date of Patent: *Jan. 9, 2018

(54) PORTABLE APPARATUS HAVING A PLURALITY OF TOUCH SCREENS AND METHOD OF OUTPUTTING SOUND THEREOF

(71) Applicant: Samsung Electronics Co., Ltd, Suwon-si, Gyeonggi-do (KR)

(72) Inventor: Seok-weon Seo, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 455 days.

This patent is subject to a terminal disclaimer.

(21) Appl. No.: 14/077,334

(22) Filed: Nov. 12, 2013

(65) Prior Publication Data

US 2014/0157125 A1 Jun. 5, 2014

(30) Foreign Application Priority Data

Dec. 3, 2012 (KR) .......................... 10-2012-0139168

(51) Int. Cl.
*G06F 3/14* (2006.01)
*G06F 3/0488* (2013.01)
(Continued)

(52) U.S. Cl.
CPC ............ *G06F 3/162* (2013.01); *G06F 1/1616* (2013.01); *G06F 1/1647* (2013.01);
(Continued)

(58) Field of Classification Search
CPC ...................................................... G06F 3/162
See application file for complete search history.

(56) References Cited

U.S. PATENT DOCUMENTS 8,495,236 B1 * 7/2013 Glasser ............. H04L 29/08522
709/203
9,684,342 B2 6/2017 Kim et al.
(Continued)

FOREIGN PATENT DOCUMENTS

CN 101788850 A 7/2010
EP 2 207 076 A2 7/2010
(Continued)

OTHER PUBLICATIONS

Extended European Search Report dated Aug. 25, 2016 in corresponding European Patent Application No. 13192542.2.
(Continued)

*Primary Examiner* — Abdullah Al Kawsar
*Assistant Examiner* — David Luu
(74) *Attorney, Agent, or Firm* — Staas & Halsey LLP

(57) ABSTRACT

A method of outputting a includes detecting a touch on a shortcut icon of a plurality of shortcut icons displayed on a touch screen, executing an application corresponding to the shortcut icon in response to the touch, detecting an angle between a first housing including a first touch screen and a second housing including a second touch screen by using a sensor, and determining an output mode based on the angle and a property of the application, and outputting a sound through a plurality of speakers according to the output mode.

22 Claims, 17 Drawing Sheets

(51) Int. Cl.
    *G06F 1/16*      (2006.01)
    *G06F 3/16*      (2006.01)
    *G06F 3/0481*    (2013.01)
    *H04M 1/02*      (2006.01)

(52) U.S. Cl.
    CPC .......... *G06F 1/1677* (2013.01); *G06F 1/1688* (2013.01); *G06F 3/0488* (2013.01); *G06F 3/04817* (2013.01); *G06F 3/04886* (2013.01); *G06F 3/1423* (2013.01); *G06F 3/165* (2013.01); *H04M 1/0214* (2013.01); *H04M 1/0243* (2013.01); *H04M 2250/16* (2013.01); *H04M 2250/22* (2013.01)

(56) References Cited

U.S. PATENT DOCUMENTS

| | | | |
|---|---|---|---|
| 2008/0076103 | A1 | 3/2008 | Wallace |
| 2010/0182265 | A1 | 7/2010 | Kim et al. |
| 2010/0321275 | A1* | 12/2010 | Hinckley .............. G06F 1/1618 345/1.3 |
| 2011/0045812 | A1 | 2/2011 | Kim et al. |
| 2011/0138439 | A1* | 6/2011 | Toba ........................ H04N 5/45 725/148 |
| 2011/0143769 | A1* | 6/2011 | Jones .................... G06F 1/1624 455/456.1 |
| 2012/0139815 | A1* | 6/2012 | Aono .................... G06F 1/1616 345/1.3 |
| 2012/0212397 | A1* | 8/2012 | Lock ........................ G09G 3/20 345/1.3 |
| 2013/0315416 | A1* | 11/2013 | Nakayama .............. H04R 3/12 381/77 |

FOREIGN PATENT DOCUMENTS

| | | |
|---|---|---|
| EP | 2 423 807 A2 | 2/2012 |
| JP | 2003-258955 | 9/2003 |

OTHER PUBLICATIONS

Chinese Office Action dated Jul. 26, 2017 in corresponding Chinese Patent Application No. 201310651522.3.

European Examination Report dated May 17, 2017 in corresponding European Patent Application No. 13192542.2.

Anonymous: "Multiple channel audio data and Wave files", Mar. 7, 2007, XP055367929, Retrieved from the Internet: URL: https://msdn.microsoft.com/en-us/library/windows/hardware/dn653308(v=vs.85).aspx.

\* cited by examiner

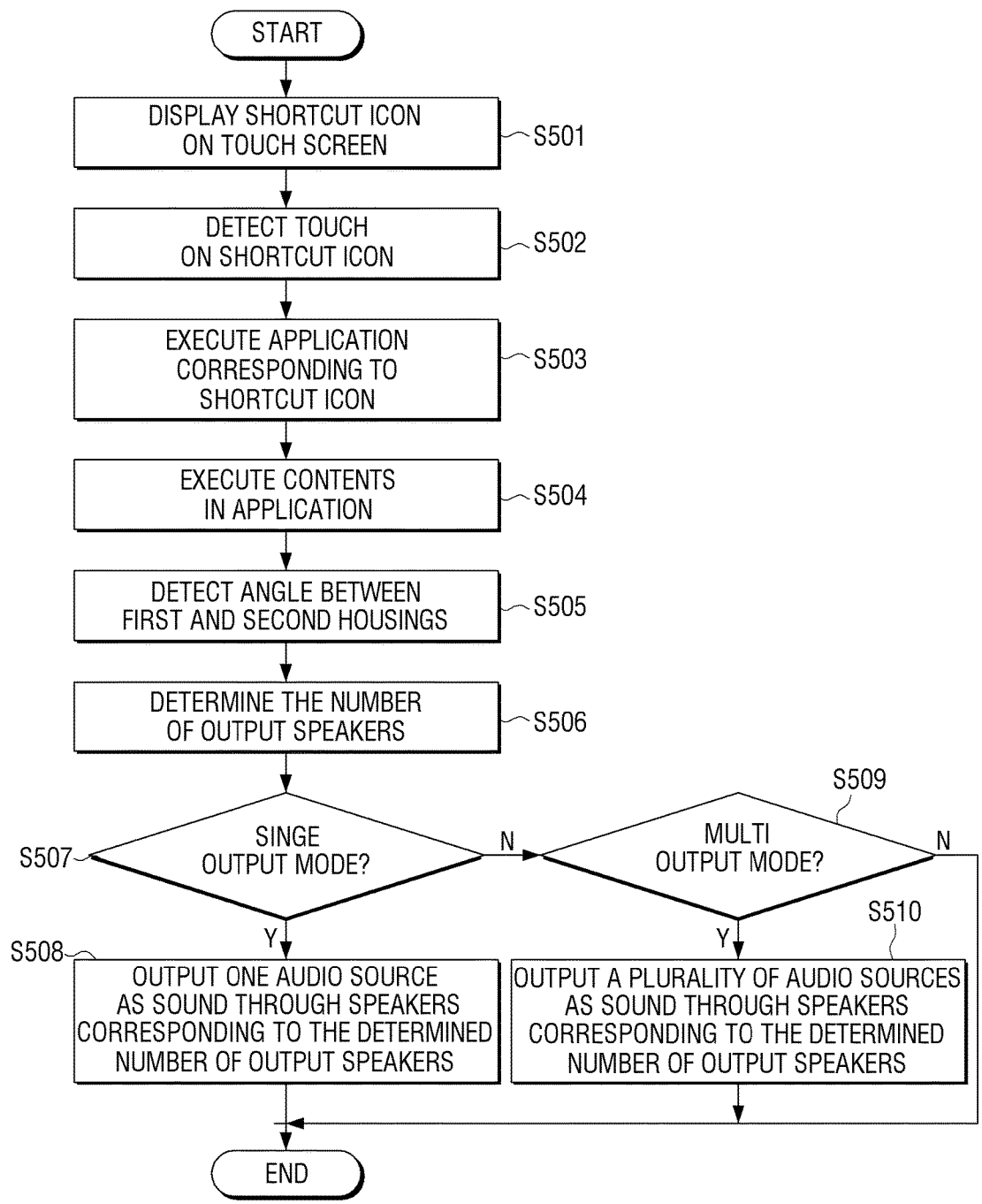

FIG. 6A
(a)
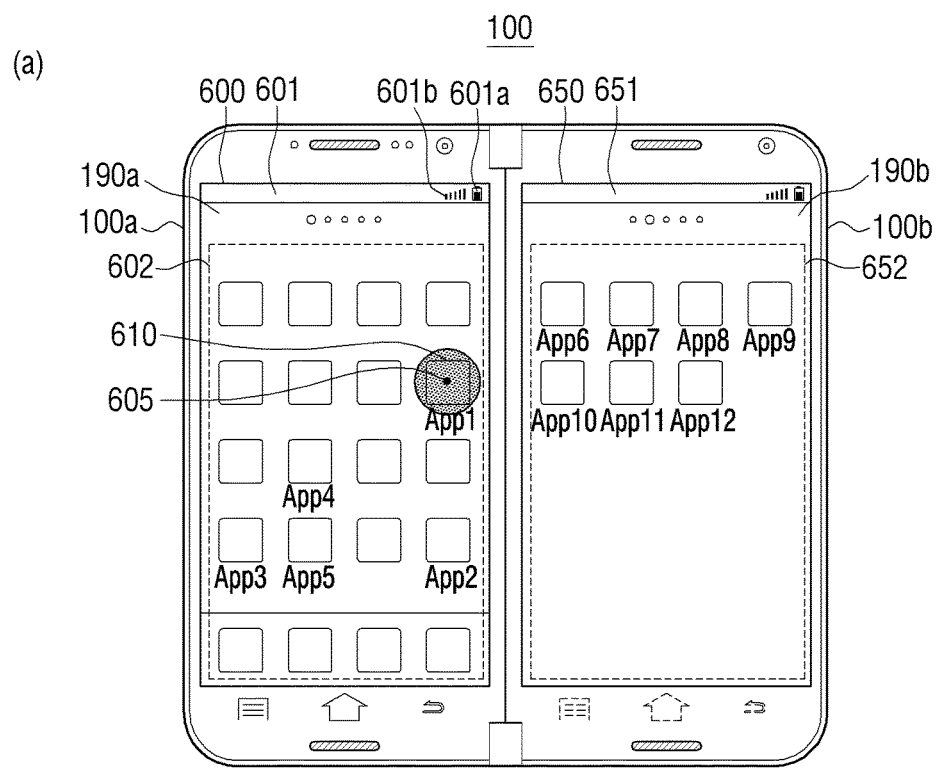
(b)
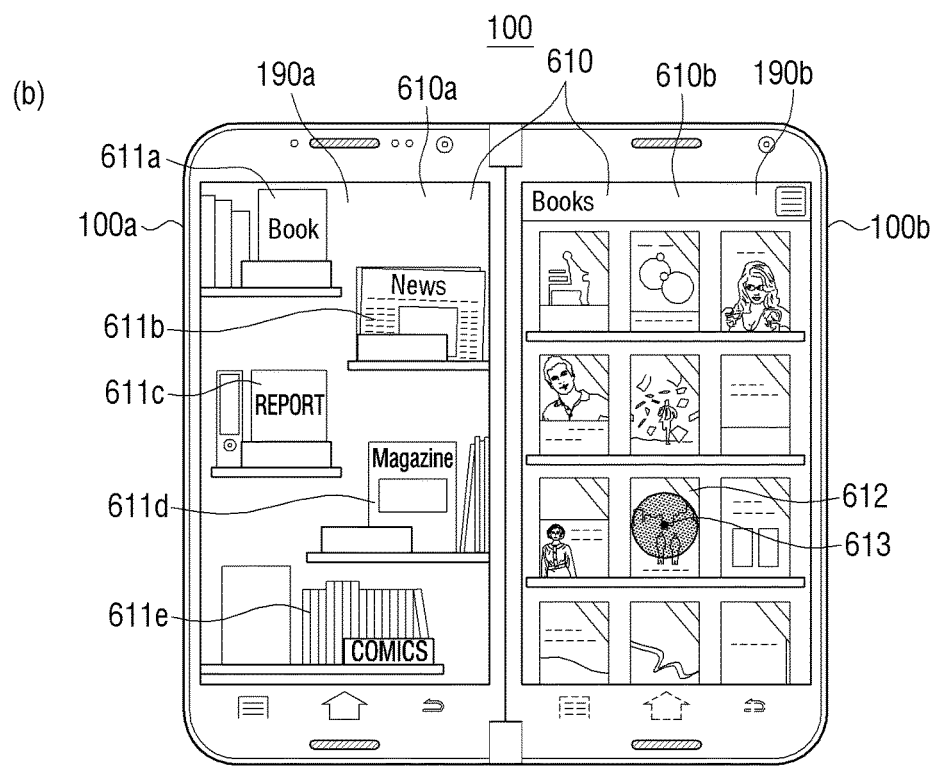

FIG. 6B
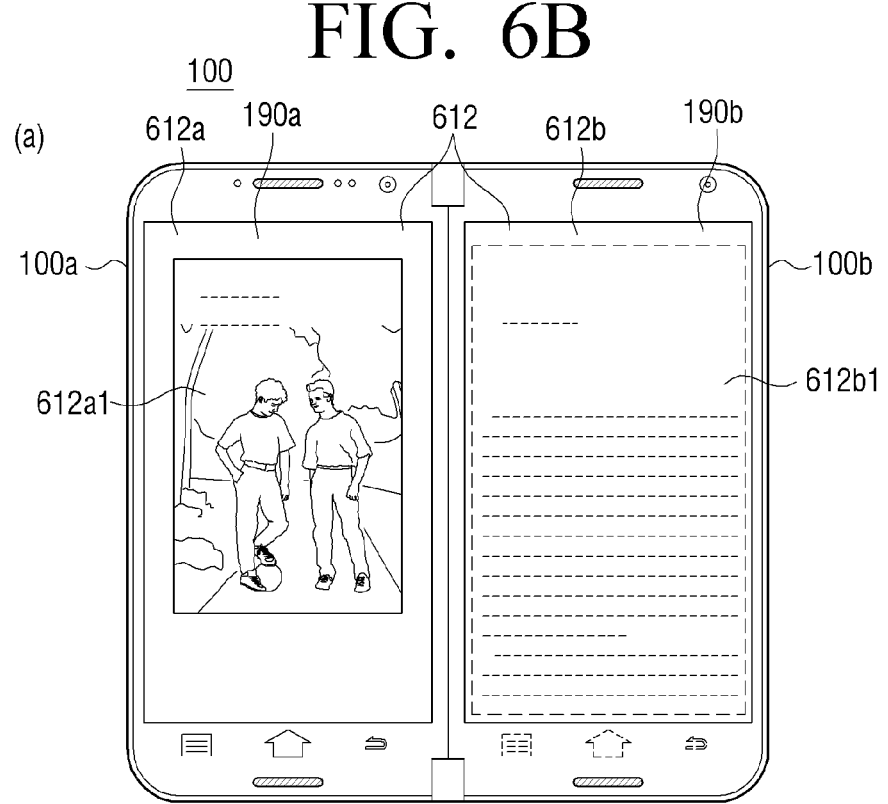
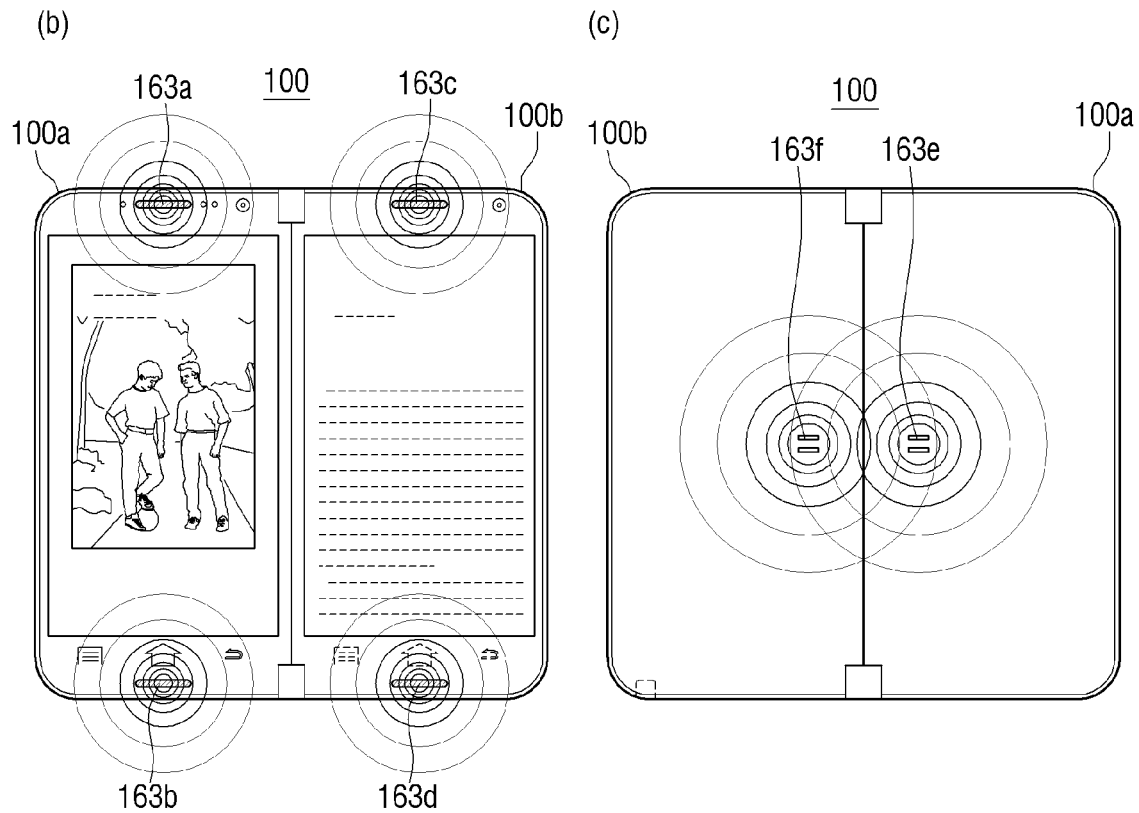

FIG. 7
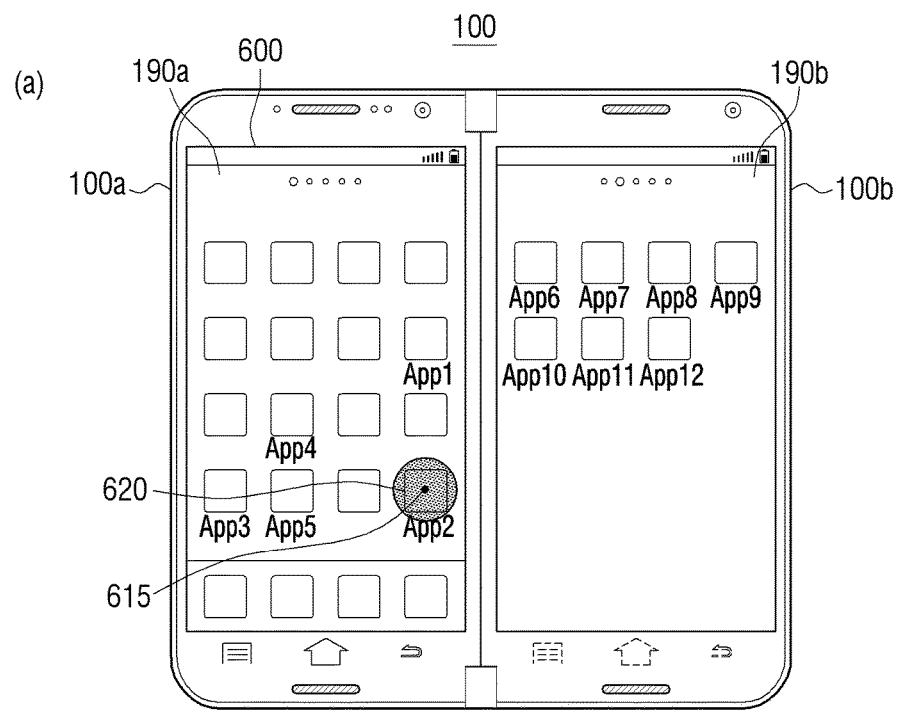
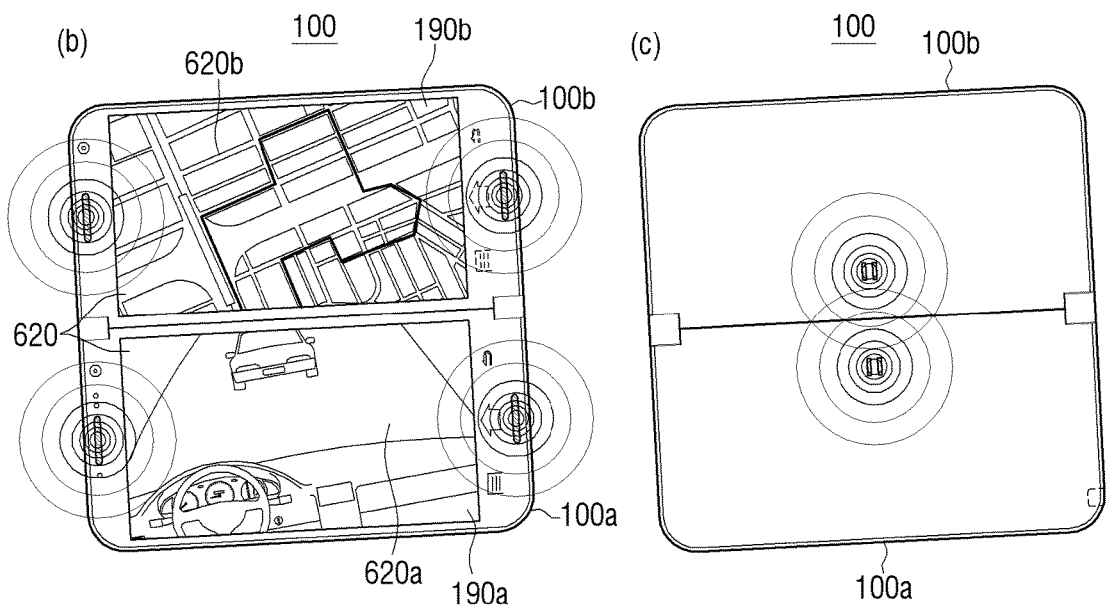

PORTABLE APPARATUS HAVING A PLURALITY OF TOUCH SCREENS AND METHOD OF OUTPUTTING SOUND THEREOF

CROSS-REFERENCE TO RELATED APPLICATIONS

This application claims the benefit of priority under 35 U.S.C. §119 to Korean Patent Application No. 10-2012-0139168, filed on Dec. 3, 2012, in the Korean Intellectual Property Office, the content of which is incorporated herein in its entirety by reference.

BACKGROUND OF THE INVENTION

1. Field of the Invention

Embodiments of the present general inventive concept generally relates to a portable apparatus having a plurality of touch screens and a method of outputting sound thereof, and more particularly, to a portable apparatus that has a plurality of touch screens and a plurality of speakers and changes a sound output mode of the portable apparatus based on angles between the plurality of touch screens, and a method of outputting a sound thereof.

2. Description of the Related Art

A desktop computer has at least one display apparatus (for example, a monitor). A portable apparatus (for example, a portable phone, a smart phone, or a tablet personal computer (PC)) using a touch screen has one display apparatus.

A user of the desktop computer outputs a sound through a plurality of speakers by using one audio source according to an operating environment. A portable apparatus using one touch screen also outputs a sound through one speaker or a plurality of speakers by using one audio source.

A portable apparatus usually has a smaller number of speakers installed than a desktop computer has installed, which makes it difficult for the user to feel sound effects of various types of channels through several speakers.

SUMMARY OF THE INVENTION

The exemplary embodiments of the present inventive concept provide a portable apparatus that has a plurality of touch screens and outputs a sound through a plurality of speakers according to an output mode that is determined according to an angle between the plurality of touch screens and a property of an executed application, and a method of outputting the sound thereof.

The exemplary embodiments of the present inventive concept also provide a portable apparatus that has a plurality of touch screens and outputs a sound in another output mode based on the same application and an angle between the plurality of touch screens, and a method of outputting the sound thereof.

The exemplary embodiments of the present inventive concept also provide a portable apparatus that has a plurality of touch screens, outputs a sound through a plurality of speakers according to an output mode that is determined according to an angle between the plurality of touch screens and a property of an executed application, and provides a haptic feedback to a user in response to the sound, and a method of outputting the sound thereof.

The exemplary embodiments of the present inventive concept also provide a portable apparatus that has a plurality of touch screens and outputs a sound through a plurality of speakers in an output mode that is determined according to an angle between the plurality of touch screens and whether a screen of one of the plurality of touch screens is turned on/off, and a method of outputting the sound thereof.

Additional features and utilities of the present general inventive concept will be set forth in part in the description which follows and, in part, will be obvious from the description, or may be learned by practice of the general inventive concept.

The foregoing and/or other features and utilities of the present inventive concept may be achieved by providing a method of outputting a sound of a portable apparatus having a plurality of touch screens, the method including detecting a touch on a shortcut icon of a plurality of shortcut icons displayed on one of a first touch screen and a second touch screen, executing an application corresponding to the shortcut icon in response to the touch, detecting an angle between a first housing including the first touch screen and a second housing including the second touch screen by using a sensor, and determining an output mode based on the angle and a property of the application, and outputting a sound through a plurality of speakers according to the output mode.

The property of the application may include at least one of a title of the application, a library used in the application, and contents executed in the application.

The angle between the first housing and the second housing may be detected within a range between 0° and 360°.

At least one of on/off of sound outputs of the plurality of speakers, a volume, and an audio source to be output may be controlled, according to the output mode, to output the sound.

The plurality of speakers may be constituted as at least one of a 2 channel, a 2.1 channel, a 4 channel, a 5.1 channel, and a 7.1 channel.

The output mode may include a single output mode, wherein the single output mode is to output one audio source through the plurality of speakers.

The output mode may include a multi-output mode, wherein the multi-output mode is to output a plurality of audio sources, respectively, through different speakers.

The method may further include displaying a screen on one of the first touch screen and the second touch screen, wherein a sound corresponding to the screen is output through the plurality of speakers.

The method may further include displaying a plurality of screens, respectively, on the first touch screen and the second touch screen, wherein a plurality of sounds corresponding to the plurality of screens are output through different speakers.

The foregoing and/or other features and utilities of the present inventive concept also provide a method of outputting a sound of a portable apparatus having a plurality of touch screens, the method including detecting a touch on a shortcut icon of a plurality of shortcut icons displayed on one of a first touch screen and a second touch screen, executing an application corresponding to the shortcut icon in response to the touch, detecting an angle between the first and second touch screens in a housing including the first touch screen and the second touch screen, and determining an output mode based on the angle and a property of the application, and outputting a sound through a plurality of speakers according to the output mode, wherein the property of the application is at least one of a title of the application and contents executed in the application.

The housing may be a flexible housing.

The foregoing and/or other features and utilities of the present inventive concept also provide a portable apparatus including a plurality of speakers, a first touch screen configured to display a plurality of shortcut ions corresponding to an application, a second touch screen, a sensor configured to detect an angle between the first touch screen and the second touch screen, a controller configured to control the plurality of speakers, the first touch screen, the second touch screen, and the sensor, wherein when the controller detects a touch on one shortcut icon from the first touch screen, the controller executes an application corresponding to the one shortcut icon, determines an output mode based on the angle and a property of the application, and controls the plurality of speakers to output a sound according to the output mode.

The portable apparatus may further include a hinge configured to connect a first housing including the first touch screen and a first one or more speakers, and a second housing including the second touch screen and a second one or more speakers.

The sensor may be positioned in at least one of the first housing, the second housing, and the hinge.

The controller may be configured to control at least one of on/off of sound outputs of the plurality of speakers, a volume, and an audio source to be output, according to the output mode.

Some of the plurality of speakers may be positioned on at least one of a front side and a back side of the first housing.

Some of the plurality of speakers may be positioned on at least one of a front side and a back side of the second housing.

Some of the plurality of speakers may be positioned on at least one of a side of the first housing and a side of the second housing, wherein the side of the first housing connects a front side of the first housing including the first touch screen to a back side of the first housing, and the side of the second housing connects a front side of the second housing including the second touch screen to a back side of the second housing.

The plurality of speakers may include at least one of a woofer speaker and a center speaker, wherein the center speaker is positioned in a center area between both sides of the first housing, and the woofer speaker is positioned between a side of the first housing and the center speaker.

The plurality of speakers may include a woofer speaker and a center speaker, wherein the center speaker is positioned in a first one of the first housing and the second housing, the woofer speaker is positioned in a second one of the first housing and the second housing, and the first one of the first housing and the second housing is different from the second one of the first housing and the second housing.

The portable apparatus may further include a housing configured to include a plurality of speakers, the first touch screen, the second touch screen, and the sensor, wherein the housing is a flexible housing without a hinge connecting the first touch screen and the second touch screen.

The foregoing and/or other features and utilities of the present inventive concept also provide a method of outputting a sound of a portable apparatus having a plurality of touch screens and a plurality of speakers, the method including detecting a touch on a shortcut icon of a plurality of shortcut icons displayed on a first touch screen, executing an application corresponding to the shortcut icon in response to the touch, detecting an angle between a first housing and a second housing, wherein the first housing includes the first touch screen and at least one first speaker, the second housing is separated from the first housing and includes a second touch screen and at least one second speaker, and outputting a sound according to a determined one of a plurality of output modes based on the angle and a property of the application.

The foregoing and/or other features and utilities of the present inventive concept also provide a portable apparatus including a plurality of speakers, a first touch screen configured to display a plurality of shortcut icons corresponding to an application, a second touch screen, a sensor configured to detect an angle between the first touch screen and the second touch screen, a hinge configured to connect a first housing to a second housing, wherein the first housing includes the first touch screen and a first one or more speakers, the second housing is separated from the first housing and includes the second touch screen and a second one or more speakers, and a controller configured to control the first one or more speakers, the second one or more speakers, the first touch screen, the second touch screen, and the sensor, wherein when the controller detects a touch on one shortcut icon from the first touch screen, the controller executes an application corresponding to the one shortcut icon, and outputs a sound through at least one speaker of the first one or more speakers and the second one or more speakers according to an output mode determined from a plurality of output modes.

The foregoing and/or other features and utilities of the present inventive concept also provide a method of outputting a sound of a portable apparatus having a plurality of touch screens and a plurality of speakers, the method including detecting a touch on a shortcut icon of a plurality of shortcut icons displayed on a first touch screen, executing an application corresponding to the shortcut icon in response to the touch, and outputting a sound according to one output mode determined from a plurality of output modes, based on an angle between a first housing and a second housing, wherein the first housing includes the first touch screen and at least one first speaker, and the second housing is separated from the first housing and includes a second touch screen and at least one second speaker.

The angle may be determined by using one of an angle sensor installed in the portable apparatus and a user input.

The foregoing and/or other features and utilities of the present general inventive concept also provide a portable apparatus including a plurality of touch screens and a plurality of speakers. A sound to be output through the plurality of speakers according to an output mode may be controlled based on an angle between touch screens of the plurality of touch screens and a property of an executed application.

The foregoing and/or other features and utilities of the present general inventive concept also provide a portable apparatus including a plurality of touch screen and a plurality of speakers. A same application may output a sound in another form based on an angle between touch screens of the plurality of touch screens.

The foregoing and/or other features and utilities of the present general inventive concept also provide a portable apparatus including a plurality of touch screens and a plurality of speakers. A haptic feedback may be provided to a user in response to a sound that is output through the plurality of speakers according to a determined output mode based on an angle between touch screens of the plurality of touch screens and a property of an executed application.

The foregoing and/or other features and utilities of the present general inventive concept also provide a portable apparatus including a plurality of touch screens and a plurality of speakers. A sound may be output through the plurality of speakers according to a determined output mode based on an angle between touch screens of the plurality of touch screens and one screen being in a power-off state.

The foregoing and/or other features and utilities of the present general inventive concept also provide a non-transitory computer-readable recording medium containing instructions which, when executed by an electronic processing element, cause the electronic processing element to perform a method, the method including receiving, under a control of the electronic processing element, a first signal indicative of a touch on a shortcut icon displayed on one of a first touch screen and a second touch screen, executing, under the control of the electronic processing element, an application in response to the first signal, receiving, under the control of the electronic processing element, a second signal indicative of an angle between a first housing and a second housing, the first touch screen disposed in the first housing, and the second touch screen disposed in the second housing, and outputting, under the control of the electronic processing element, a sound through a plurality of speakers according to an output mode determined from the second signal and a property of the application.

The foregoing and/or other features and utilities of the present general inventive concept also provide a non-transitory computer-readable recording medium containing instructions which, when executed by an electronic processing element, cause the electronic processing element to perform a method, the method including receiving, under a control of the electronic processing element, a first signal indicative of a touch on a shortcut icon displayed on one of a first touch screen and a second touch screen, executing, under the control of the electronic processing element, an application in response to the first signal, receiving, under the control of the electronic processing element, a second signal indicative of an angle between a first touch screen and a second touch screen, the first touch screen and the second touch screen disposed in a housing, and outputting, under the control of the electronic processing element, a sound through a plurality of speakers according to an output mode determined from the second signal and a property of the application.

The foregoing and/or other features and utilities of the present general inventive concept also provide a non-transitory computer-readable recording medium containing instructions which, when executed by an electronic processing element, cause the electronic processing element to perform a method, the method including receiving, under a control of the electronic processing element, a first signal indicative of a touch on a shortcut icon displayed on a first touch screen, executing, under the control of the electronic processing element, an application in response to the first signal, receiving, under the control of the electronic processing element, a second signal indicative of an angle between a first housing and a second housing, the first touch screen and at least one first speaker disposed in the first housing, and a second touch screen and at least one second speaker disposed in the second housing, and outputting, under the control of the electronic processing element, a sound according to an output mode determined from the second signal.

The foregoing and/or other features and utilities of the present general inventive concept also provide a non-transitory computer-readable recording medium containing instructions which, when executed by an electronic processing element, cause the electronic processing element to perform a method, the method including receiving, under a control of the electronic processing element, a signal indicative of a touch on a shortcut icon displayed on a first touch screen, executing, under the control of the electronic processing element, an application in response to the signal, and outputting, under the control of the electronic processing element, a sound according to an output mod determined from an angle between a first housing and a second housing, the first touch screen and at least one first speaker disposed in the first housing, and a second touch screen and at least one second speaker disposed in the second housing.

The foregoing and/or other features and utilities of the present general inventive concept also provide a portable apparatus including a first portion having a first touch screen, a second portion having a second touch screen, a sensor configured to determine an angle between the first portion and the second portion and to produce a first signal indicative of the angle, and a controller configured to determine an output mode of speakers based on the first signal and a second signal indicative of a property of a software application of the portable apparatus.

The foregoing and/or other features and utilities of the present general inventive concept also provide a method of determining an output mode of a portable apparatus, the method including receiving a first signal indicative of an angle between a first portion of the portable apparatus and a second portion of the portable apparatus, the first portion having a first touch screen, and the second portion having a second touch screen, receiving a second signal indicative of a property of a software application of the portable apparatus, and determining the output mode of speakers of the portable apparatus based on the first signal and the second signal.

The foregoing and/or other features and utilities of the present general inventive concept also provide a non-transitory computer-readable recording medium containing instructions which, when executed by an electronic processing element, cause the electronic processing element to perform a method, the method including receiving, under a control of the electronic processing element, a first signal indicative of an angle between a first portion of the portable apparatus and a second portion of the portable apparatus, the first portion having a first touch screen, and the second portion having a second touch screen, receiving, under the control of the electronic processing element, a second signal indicative of a property of a software application of the portable apparatus, and determining, under the control of the electronic processing element, the output mode of speakers of the portable apparatus based on the first signal and the second signal.

The foregoing and/or other features and utilities of the present general inventive concept also provide a portable apparatus including a first portion having a first touch screen and a first speaker, a second portion having a second touch screen and a second speaker, a sensor configured to determine an angle between the first portion and the second portion and to produce a signal indicative of the angle, and a controller configured to determine an output mode of speakers based on the signal.

The foregoing and/or other features and utilities of the present general inventive concept also provide a method of determining an output mode of a portable apparatus, the method including receiving a signal indicative of an angle between a first portion of the portable apparatus and a second portion of the portable apparatus, the first portion having a first touch screen and a first speaker, and the second portion having a second touch screen and a second speaker, and determining the output mode of the first speaker and the second speaker based on the signal.

The foregoing and/or other features and utilities of the present general inventive concept also provide a non-transitory computer-readable recording medium containing instructions which, when executed by an electronic processing element, cause the electronic processing element to perform a method, the method including receiving, under a control of the electronic processing element, a signal indicative of an angle between a first portion of the portable apparatus and a second portion of the portable apparatus, the first portion having a first touch screen and a first speaker, and the second portion having a second touch screen and a second speaker, and determining, under the control of the electronic processing element, the output mode of the first speaker and the second speaker based on the signal.

BRIEF DESCRIPTION OF THE DRAWINGS

These and/or other features and utilities of the present inventive concept will become apparent and more readily appreciated from the following description of the embodiments, taken in conjunction with the accompanying drawings of which:

FIG. 5 is a flowchart illustrating a method of outputting a sound of a portable apparatus according to an exemplary embodiment of the present general inventive concept;

FIGS. 6A and 6B are views illustrating a method of outputting a sound of a portable apparatus according to an exemplary embodiment of the present general inventive concept;

FIG. 7 includes views illustrating a method of outputting a sound of a portable apparatus according to another exemplary embodiment of the present general inventive concept;

DETAILED DESCRIPTION OF THE EMBODIMENTS

Figure 1A:
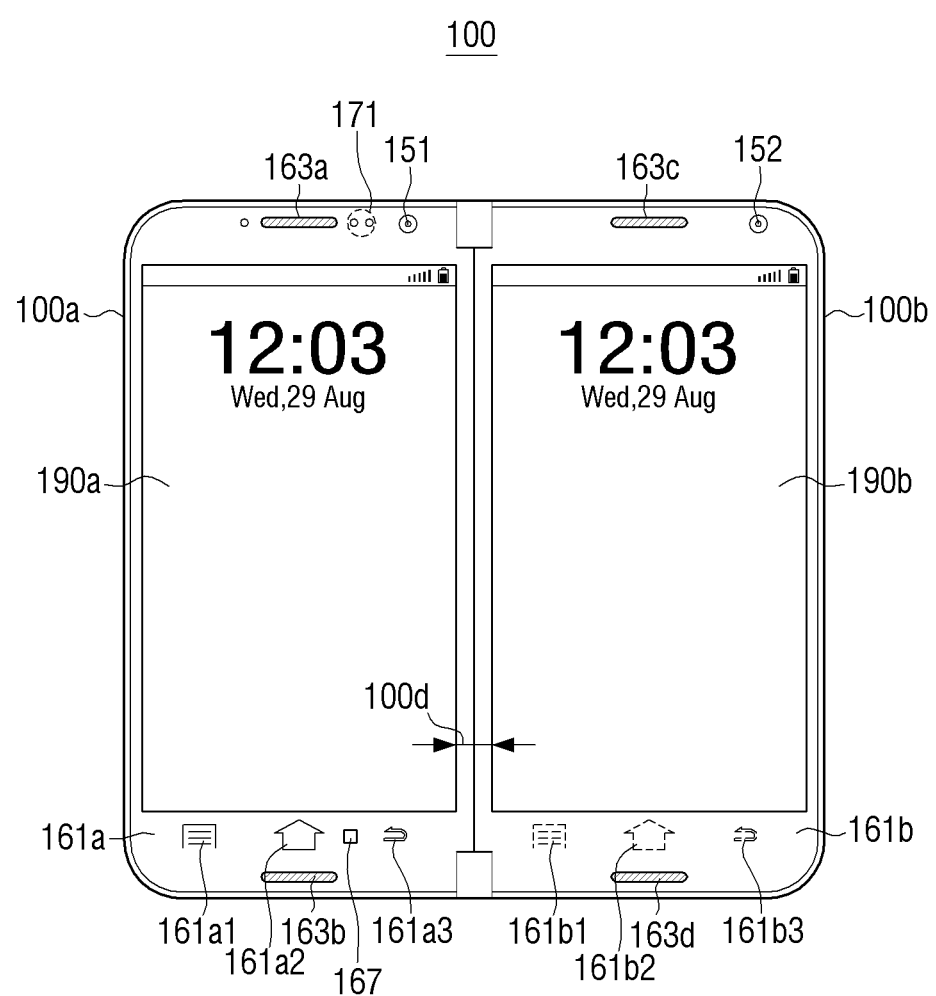
FIGS. 1A and 1B are views illustrating a portable apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined in the description, such as detailed construction and elements, are provided to assist in a comprehensive understanding of the exemplary embodiments of the present inventive concept. Thus, it is apparent that the exemplary embodiments of the present inventive concept may be carried out without those specifically defined matters. Also, well-known functions or constructions are not described in detail since they would obscure the exemplary embodiments of the present inventive concept with unnecessary detail.

Figure 1B:
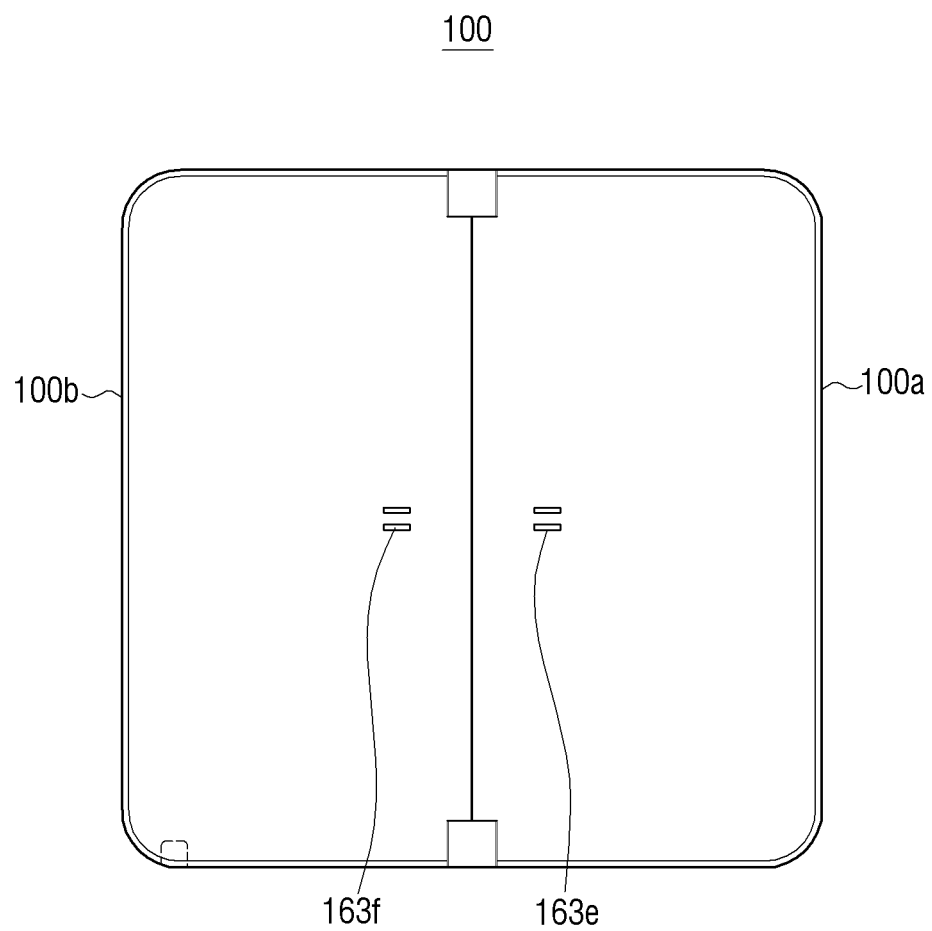

FIGS. 1A and 1B are views illustrating a portable apparatus 100 according to an exemplary embodiment of the present general inventive concept. In detail, FIG. 1A is a view illustrating a front side of the portable apparatus 100. FIG. 1B is a view illustrating a back side of the portable apparatus 100.

Referring to FIG. 1A, the portable apparatus 100 may have a plurality of touch screens and a plurality of speakers and may include a first housing 100a and a second housing 100b. Here, the first and second housings 100a and 100b may be connected to each other, for example, through a hinge and/or flexible plastic. The first and second housings 100a and 100b, respectively, may include first and second touch screens 190a and 190b in centers thereof. The first and second touch screens 190a and 190b may be separated by a distance 100d from each other by the hinge. Hereinafter, the portable apparatus 100 is described as including a plurality of housings, but the portable apparatus 100 may include one flexible housing having a plurality of touch screens and a plurality of speakers.

A first camera 151, a proximity sensor 171, and a first speaker 163a may be positioned, for example, on a top of a front side of the first housing 100a. The proximity sensor 171 may also be positioned on the second housing 100b. The first camera 151 may photograph, for example, still images and/or videos, the proximity sensor 171 may detect a proximity of a user or an object, and the first speaker 163a may output a voice and/or a sound outside of the portable apparatus 100. The first touch screen 190a may be positioned, for example, in a center of the front side of the first housing 100a. A second speaker 163b may be positioned, for example, on a bottom of the front side of the first housing 100a and may output a voice and/or a sound outside of the portable apparatus 100. A first button group 161a may include one button 161a2 or a plurality of buttons 161a1 through 161a3 and may be positioned, for example, on the bottom of the front side of the first housing 100a.

A second camera 152 and a third speaker 163c may be positioned, for example, on a top of a front side of the second housing 100b. The second camera 152 may photograph, for example, still images and/or videos, and the third speaker 163c may output a voice and/or a sound outside of the portable apparatus 100. The second touch screen 190b may be positioned, for example, in a center of the front side of the second housing 100b. A fourth speaker 163d may be positioned, for example, on a bottom of the front side of the second housing 100b and may output a voice and/or a sound outside of the portable apparatus 100. A second button group 161b may include one button 161b2 or a plurality of buttons 161b1 through 161b3 and may be positioned, for example, on the bottom of the front side of the second housing 100b. The buttons 161a1 through 161b3 of the first and second button groups 161a and 161b may be realized, for example, as touch button rather than as physical buttons.

Referring to FIG. 1B, a fifth speaker 163e may be positioned, for example, on a back side of the first housing 100a and may output a voice and/or a sound outside of the portable apparatus 100. For example, referring to FIG. 1A, an input unit 167 that may use an electromagnetic induction method may be positioned as an option on the bottom of the front side of the first housing 100a. Alternatively, the first and second touch screens 190a and 190b of the portable apparatus 100, according to an exemplary embodiment of the present inventive concept, may be changed into touch screens (not illustrated) that correspond to an input of the input unit 167 that may be applied as an option and may use, for example, the electromagnetic induction method.

Referring to FIG. 1B, a sixth speaker 163f may be positioned, for example, on a back side of the second housing 100b and may output a voice and/or a sound outside of the portable apparatus 100.

At least one of the elements of the portable apparatus 100 illustrated in FIGS. 1A and 1B may be added or removed according to a performance requirement of the portable apparatus 100. It is easily understood by those skilled in the art in light of the descriptions included herein that positions of the elements of the portable apparatus 100 may be changed according to the performance requirement or a structure of the portable apparatus 100.

Figure 2:
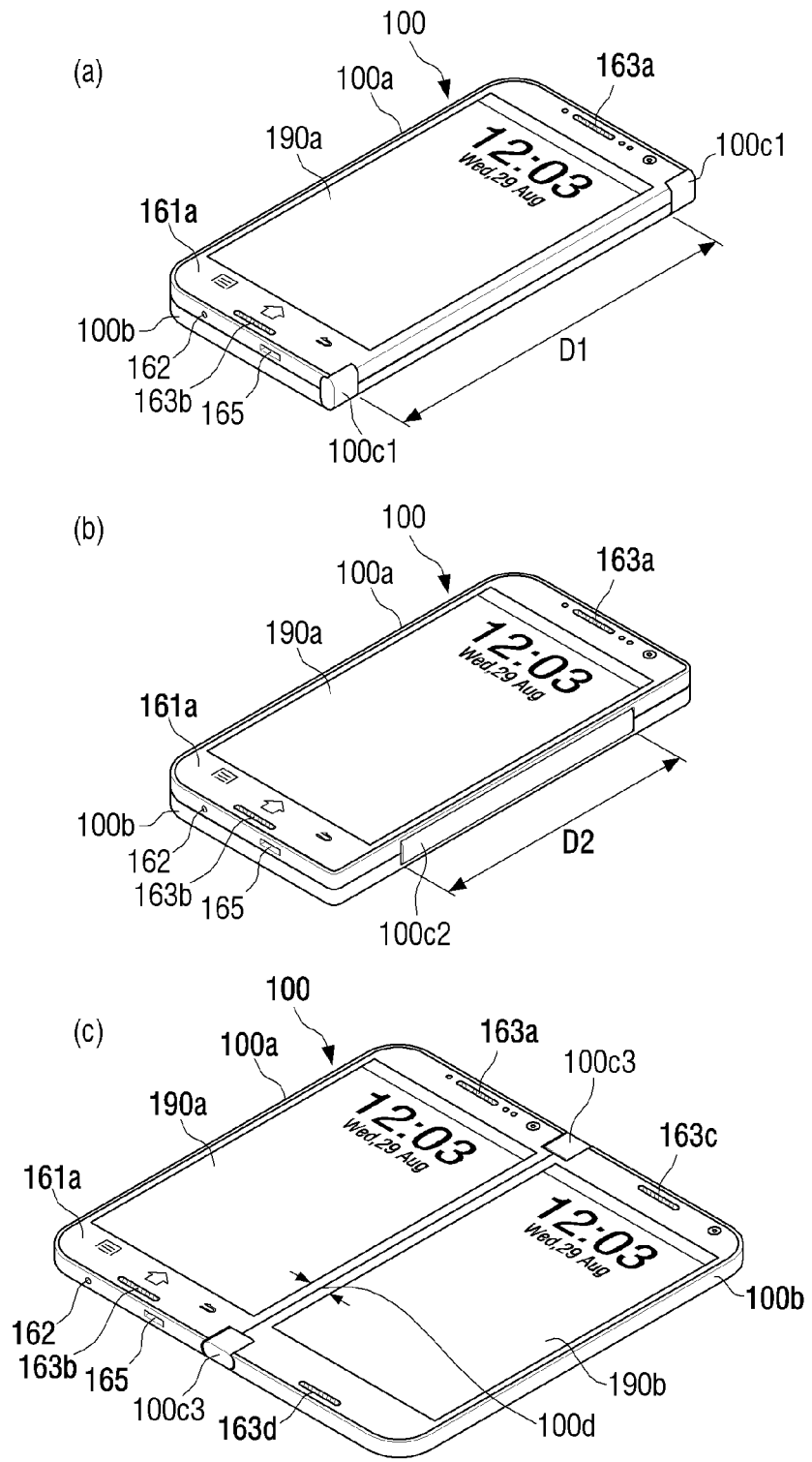
FIG. 2 includes perspective views illustrating portable apparatuses according to exemplary embodiments of the present general inventive concept.

FIG. 2 includes perspective views illustrating the portable apparatus 100 according to an exemplary embodiment of the present general inventive concept.

Referring to views (a) and (b) of FIG. 2, the first housing 100a and the second housing 100b of the portable apparatus 100 may be folded (for example, an angle between the first and second housings 100a and 100b is 0°). Referring to FIGS. 1A, 1B, and a view (c) of FIG. 2, the first and second housings 100a and 100b may be unfolded (for example, the angle between the first and second housings 100a and 100b is 180°).

Hinges 100c1, 100c2, or 100c3 may be positioned, for example, between the first and second housings 100a and 100b to fold and to unfold the first and second housings 100a and 100b. The first and second housings 100a and 100b may move at an angle determined within a range, for example, from 0° to 360° through the hinges 100c1, 100c2, or 100c3. Referring to the view (a) of FIG. 2, when the first and second housings 100a and 100b are folded, the back side of the first housing 100a and the back side of the second housing 100b may be parallel with or, in other words, opposite to each other (for example, the angle between the back sides of the first and second housings 100a and 100b may be less than or equal to 4°). The back sides of the first and second housings 100a and 100b may contact each other or may be separated by a preset distance (for example, 5 mm) from each other.

At least one power/lock button (not illustrated) and a volume button (not illustrated) may be positioned, for example, on a side of the first housing 100a. For example, only the power/lock button may be positioned on the side of the first housing 100a, only the volume button may be positioned on the side of the first housing 100a, or both of the power/lock button and the volume button may be positioned on the side of the first housing 100a.

A microphone 162 and/or a connector 165 may be positioned, for example, on a lower side of the first housing 100a. At least one of the microphone 162 and the connector 165 may also be positioned on the second housing 100b.

The plurality of hinges 100c1 may connect both ends of right sides, for example, of the first and second housings 100a and 100b so that the both ends may be separated by a distance D1 from each other. When the first and second housings 100a and 100b are folded, a distance from the first touch screen 190a of the portable apparatus 100 to an edge of the first housing 100a may be, for example, within a range of 2±½ mm of the distance 100d.

The first and second touch screens 190a and 190b may be positioned, for example, in a vertical direction by the hinges 100c1. As illustrated in the view (a) of FIG. 2, a length of each of the first and second touch screens 190a and 190b may be shorter than or longer than the distance D1. In an exemplary embodiment of the present inventive concept, the touch screens 190a and 190b may have rectangular shapes, but shapes and arrangements of the touch screens 190a and 190b may be variously changed. FIG. 1A may be a view illustrating the portable apparatus 100 of a view (a) FIG. 2 that is unfolded.

Referring to the view (b) of FIG. 2, the portable apparatus 100 may include the first housing 100a, the second housing 100b, and one hinge 100c2. The first and second housings 100a and 100b may be folded. The hinge 100c2 may connect central portions of right sides, for example, of the first and second housings 100a and 100b.

An arrangement of the front side of the portable apparatus 100, an arrangement of the side of the portable apparatus 100, and an angle between the first and second housings 100a and 100b may be equivalent to an arrangement of the front side of the portable apparatus 100, the arrangement of the side of the portable apparatus 100, and the angle between the first and second housings 100a and 100b described with reference to the view (a) of FIG. 2. Therefore, repeated descriptions are omitted.

As illustrated in the view (b) of FIG. 2, each of the first and second touch screens 190a and 190b may have a length longer than or shorter than a distance D2. FIG. 1A may be a view illustrating the portable apparatus 100 of the view (b) of FIG. 2 that is folded.

Referring to the view (c) of FIG. 2, the portable apparatus 100 may include the first housing 100a, the second housing 100b, and a plurality of hinges 100c3. In a manner different from an embodiment of the present inventive concept illustrated in FIG. 1A, as illustrated in the view (c) of FIG. 2, the plurality of hinges 100c3 that may connect the first and second housings 100a and 100b to each other may be exposed on front sides of the first and second housings 100a and 100b.

Arrangements of the front side and the side of the portable apparatus 100 and an angle between the first and second housings 100a and 100b may be equivalent to the arrangements of the front side and the side of the portable apparatus 100 and the angle between the first and second housings 100a and 100b described with reference to the view (a) of FIG. 2. Therefore, repeated descriptions are omitted.

Similar to an embodiment of the present inventive concept illustrated in FIGS. 1A and 1B, as illustrated in the view (c) of FIG. 2, the distance 100d may be formed between the first and second housings 100a and 100b.

The hinges 100c1, 100c2, and 100c3 may be, for example, biaxial hinges (not illustrated) that may rotate the first housing 100a and/or the second housing 100b and that use a first hinge axis (not illustrated) that corresponds to the first housing 100a and a second hinge axis (not illustrated) that corresponds to the second housing 100b.

The hinges 100c1, 100c2, and 100c3 may include, for example, at least one angle sensor 172 (see FIGS. 3 and 4) that may detect an angle between the first and second housings 100a and 100b. The angle sensor 172 is described below with reference to FIG. 3.

Figure 3:
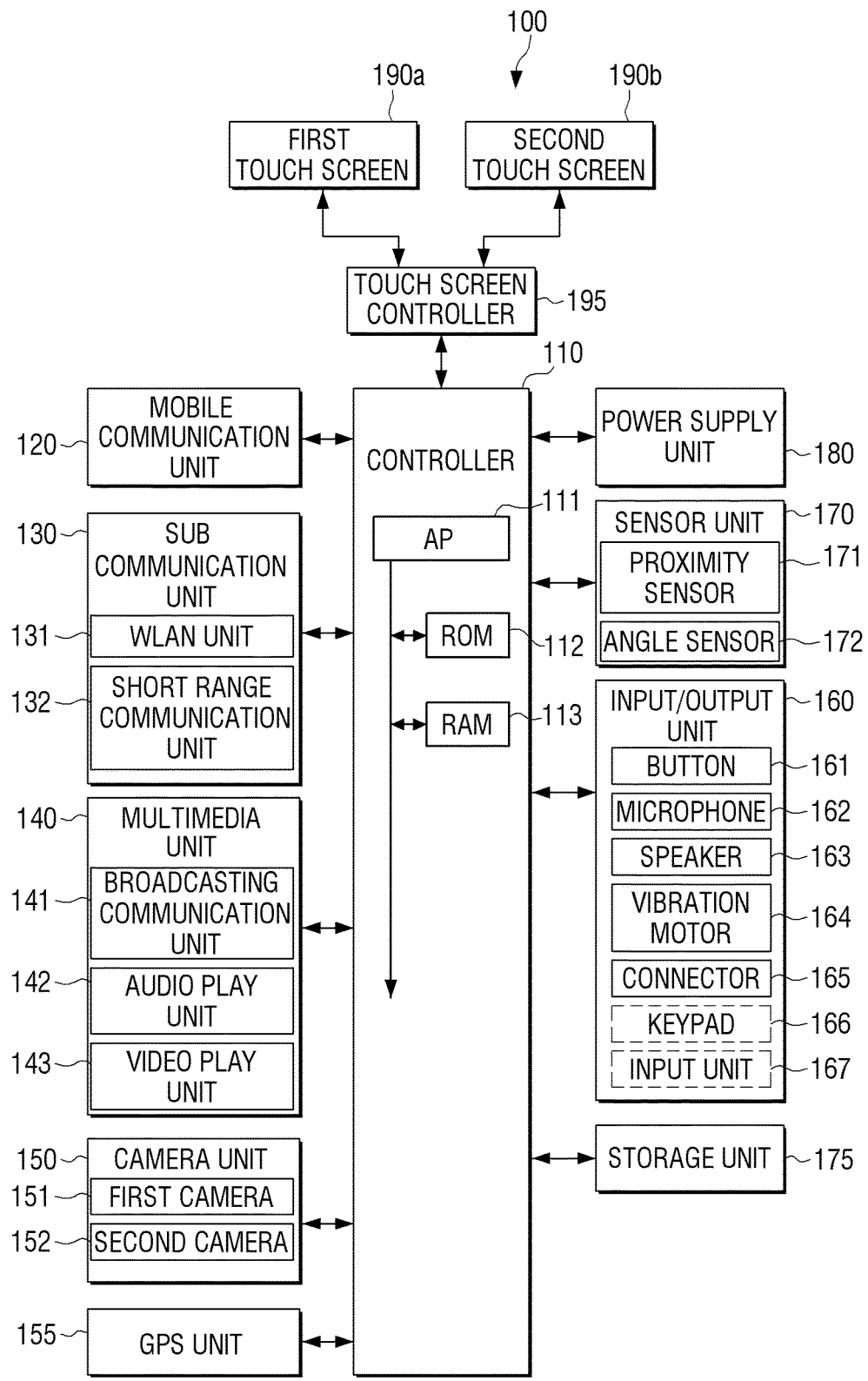
FIG. 3 is a schematic block diagram illustrating a portable apparatus according to an exemplary embodiment of the present invention inventive concept.

FIG. 3 is a schematic block diagram illustrating the portable apparatus 100 according to an exemplary embodiment of the present general inventive concept.

Referring to FIG. 3, the portable apparatus 100 may be configured to be connected to an external apparatus (not illustrated) by using, for example, a mobile communication unit 120, a sub communication unit 130, and the connector 165. The external apparatus may be, for example, another portable apparatus (not illustrated), a portable phone (not illustrated), a smart phone (not illustrated), a tablet PC (not illustrated), and a server (not illustrated).

The portable apparatus 100 may include the first touch screen 190a, the second touch screen 190b, and a touch screen controller 195. The portable apparatus 100 may further include, for example, a controller 110, the mobile communication unit 120, the sub communication unit 130, a multimedia unit 140, a camera unit 150, a global positioning system (GPS) unit 155, an input/output unit 160, a sensor unit 170, a storage unit 175, and a power supply unit 180. The sub communication unit 130 may include, for example, at least one of a wireless local area network (WLAN) unit 131 and a short range communication unit 132. The multimedia unit 140 may include, for example, at least one of a broadcasting communication unit 141, an audio play unit 142, and a video play unit 143. The camera unit 150 may include, for example, at least one of a first camera 151 and a second camera 152. The input/output unit 160 may include at least one of a button 161, the microphone 162, the speaker 163, a vibration motor 164, the connector 165, a keypad 166, and the input unit 167. The sensor unit 170 may include, for example, the proximity sensor 171 and the angle sensor 172.

The controller 110 may include, for example an application processor (AP) 111, a read only memory (ROM) 112, and a random access memory (RAM) 113. The ROM 112 may store a control program for controlling the portable apparatus 100. The RAM 113 may store a signal or data input from outside of the portable apparatus 100 or may be used as a storage area for an operation performed in the portable apparatus 100.

The controller 110 may control an overall operation of the portable apparatus 100 and a signal flow between internal elements 120 through 195 of the portable apparatus 100 and may process data. The controller 110 may control a power supply from the power supply unit 180 to the internal elements 120 through 195. The controller 110 may execute an operating system (OS) and/or an application stored in the storage unit 175.

The AP 111 may include a graphic processing unit (GPU) (not illustrated) configured to perform graphic processing. The AP 111 may be a System On a Chip (SoC) that may include a central processing unit (CPU) (not illustrated) (or core) and the GPU (not illustrated). The AP 111 may include a single core, a dual core, a triple core, a quad core, and/or a multiple core. The AP 111, the ROM 112, and the RAM 113 may be connected to one another through an internal bus (not illustrated).

The controller 110 may control, for example, the mobile communication unit 120, the sub communication unit 130, the multimedia unit 140, the camera unit 150, the GPS unit 155, the input/output unit 160, the sensor unit 170, the storage unit 175, the power supply unit 180, the first touch screen 190a, the second touch screen 190b, and the touch screen controller 195.

Figure 4:
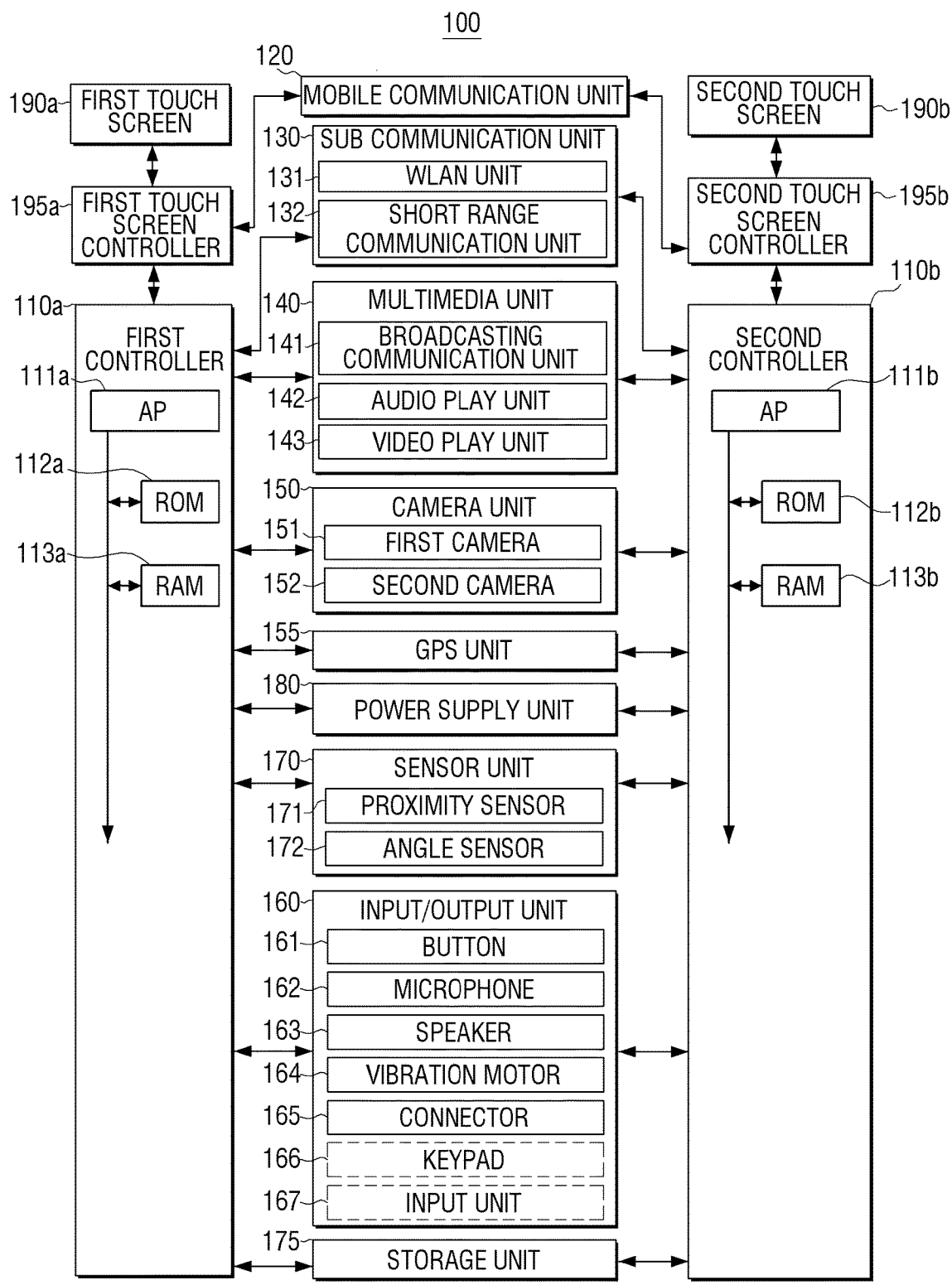
FIG. 4 is a schematic block diagram illustrating a portable apparatus according to another exemplary embodiment of the present invention inventive concept.

The term "controller" used herein may include the controller 110, a first controller 110a (see FIG. 4), and/or a second controller 110b (see FIG. 4).

The mobile communication unit 120 may be controlled by the controller 110 to connect the portable apparatus 100 to an external apparatus by using one antenna or a plurality of antennas (not illustrated) through a mobile communication method. The mobile communication unit 120 may transmit and/or receive a wireless signal for, for example, a voice call, a video call, a short message service (SMS), a multimedia message service (MMS), and a data communication with a portable phone (not illustrated), a smart phone (not illustrated), a tablet PC, or another portable apparatus (not illustrated) that has a phone number input into the portable apparatus 100.

The sub communication unit 130 may include, for example, at least one of the WLAN unit 131 and the short range communication unit 132. For example, the sub communication unit 130 may include only the WLAN unit 131, include only the short range communication unit 132, or include both of the WLAN unit 131 and the short range communication unit 132.

The WLAN unit 131 may be controlled by the controller 110 to be connected to the Internet by wireless at a place in which an access point (not illustrated) may be installed. The WLAN unit 131 may support WLAN standard IEEE 802.11x of the IEEE. The short range communication unit 132 may be controlled by the controller 110 to perform a short range communication by a wireless method between the portable apparatus 100 and an external apparatus. The short range communication may include, for example, a Bluetooth communication, an infrared data association (IrDA) communication, a near field communication (NFC), etc.

The portable apparatus 100 may include, for example, at least one of the mobile communication unit 120, the WLAN unit 131, and the short range communication unit 132 according to a performance requirement of the portable apparatus 100. For example, the portable apparatus 100 may include a combination of the mobile communication unit 120, the WLAN unit 131, and the short range communication unit 132.

The multimedia unit 140 may include, for example, the broadcasting communication unit 141, the audio play unit 142, or the video play unit 143. The broadcasting communication unit 141 may be controlled by the controller 110 to receive a broadcast signal (for example, a TV broadcast signal, a radio broadcast signal, and/or a data broadcast signal) and to broadcast additional information (for example, an Electric Program Guide (EPS) and/or an Electric Service Guide (ESG)) from an external broadcasting station through a broadcasting communication antenna (not illustrated). The audio play unit 142 may be controlled by the controller 110 to play an audio source (for example, an audio that has a file extension mp3, wma, ogg, and/or way) by using a first coder-decoder (codec) unit (not illustrated). Here, the audio source may be stored in the storage unit 175 or may be received from outside of the portable apparatus 100. The video play unit 143 may be controlled by the controller 110 to play a digital video file (for example, a file that has a file extension mpeg, mpg, mp4, avi, mov, or mkv) by using a second codec unit (not illustrated). Here, the digital video file may be stored in the storage unit 175 of the portable apparatus 100 or may be pre-stored in or received from outside of the portable apparatus 100. Some applications that may be installed in the portable apparatus 100 may play audios and videos by using the first or second codec unit or a combined codec unit (not illustrated).

If an audio source is played through a 5.1 channel, according to the present general inventive concept, by using one codec unit (not illustrated), the controller 110 may input the audio source into the codec unit through, for example, an Inter IC Sound (I2S) port (not illustrated). The codec unit may output the input audio source through speakers 163a, 163b, and 163e positioned in the first housing 100a and speakers 163c, 163d, and 163f positioned in the second housing 100b. The directional speakers 163a through 163f positioned in the portable apparatus 100 may provide divided sound sources to a user without interferences or the like in each direction.

If the audio source is played through the 5.1 channel according to the present general inventive concept by using a multi codec unit (not illustrated), the controller 110 may divide the audio source into a primary sound source and a secondary sound source, i.e., into two channels and input the primary sound source and the secondary sound source, respectively, into first and second codec units through the I2S port. The first codec unit may output the input primary sound source through the speakers 163a, 163b, and 163e positioned in the first housing 100a. The second codec unit may output the input secondary sound source through the speakers 163c, 163d, and 163f positioned in the second housing 100b. The directional speakers 163a through 163 f positioned in the portable apparatus 100 may provide divided source sources to the user without interferences or the like in each direction.

It is easily understood by those skilled in the art in light of the descriptions included herein that many types of codec units have been produced and sold and may be employed in embodiments of the present inventive concept. Alternatively, the video play unit 143 may also play the audio source.

The multimedia unit 140 may include, for example. the audio play unit 142 and the video play unit 143 without the broadcasting communication unit 141. The audio play unit 142 or the video play unit 143 of the multimedia unit 140 may be included, for example. in the controller 110.

The camera unit 150 may include, for example, at least one of the first camera 151 of the first housing 100a and the second camera 152 of the second housing 100b that may photograph a still image and/or a video under control of the controller 110. The camera unit 150 may include one or both of the first and second cameras 151 and 152. For example, the first camera 151 or the second camera 152 may include an auxiliary light source (for example, a flash (not illustrated)) that may provice an amount of light necessary for photographing.

According to an exemplary embodiment of the present inventive concept, the first and second cameras 151 and 152 may be adjacent to each other (for example, a distance between the first and second cameras 151 and 152 may be longer than 2 cm, but shorter than 8 cm when the first and second housings 100a and 100b are unfolded, as illustrated in FIG. 1A, or in a state as described with reference to a view (a) of FIG. 10), to photograph a three dimensional (3D) still image and/or a 3D video. If the distance between the first and second cameras 151 and 152 is shorter than a horizontal length of the first housing 100a, the first and second cameras 151 and 152 may be positioned, for example, only in the first housing 100a or the second housing 100b. If the distance between the first and second cameras 151 and 152 is longer than the horizontal length of the first housing 100a, the first and second cameras 151 and 151 may be positioned, for example, respectively, in the first and second housings 100a and 100b.

The GPS unit 155 may receive electric waves from a plurality of GPS satellites (not illustrated) that orbit the Earth. The portable apparatus 100 may calculate a position thereof by using Time of Arrival from the GPS satellites to the GPS unit 155.

The input/output unit 160 may include, for example, at least one of the at least one of the button 161, the microphone 162, the speaker 163, the vibration motor 164, the connector 165, the keypad 166, and the input unit 167.

For example, the at least one of the button 161 may include the first button group 161a positioned on the bottom of the front side of the first housing 100, the second button group 161b positioned on the bottom of the front side of the second housing 100b, or the power/lock button (not illustrated) and at least one button (not illustrated) positioned on the side of the second housing 100b.

The first button group 161a may be formed on the bottom of the front side of the first housing 100a and may include, for example, a menu button 161a1, a home button 161a2, and a back button 161a3 (see FIG. 1A). The second button group 161b may be formed on the bottom of the front side of the second housing 100b and may include, for example, a menu button 161b1, a home button 161b2, and a back button 161b3. The first button group 161a may include, for example, only the home button 161a2. The second button group 161b may also include, for example, only the home button 161b2. Buttons of the first button group 161a and buttons of the second button group 161b may be realized, for example, as touch buttons rather than as physical buttons. The portable apparatus 100 may include, for example, only the buttons 161a1 through 161a3 of the first button group 161a. The buttons 161a1 through 161a3 of the first button group 161a may be realized, for example, as touch buttons.

The microphone 162 may be controlled by the controller 110 to receive a voice or a sound from the outside in order to generate an electrical signal. The electrical signal generated by the microphone 162 may be converted by a codec unit (not illustrated) and then stored in the storage unit 175 or output through the speaker 163. One microphone 162 or a plurality of microphones 162 may be positioned in the first and second housings 100a and 100b of the portable apparatus 100. For example, at least one or more microphones 162 may be positioned only in the first housing 1001, only in the second housing 100b, or in both of the first and second housings 100a and 100b.

The speaker 163 may be controlled by the controller 110 to output sounds corresponding to various types of signals (for example, a wireless signal, a broadcast signal, an audio source, a vide file, photo capturing, etc.) of the mobile communication unit 120, the sub communication unit 130, the multimedia unit 140, and/or the camera unit 150 outside the portable apparatus 100 by using a codec unit (not illustrated).

The speaker 163 may output a sound (for example, a button operation sound or a ring back tone) that corresponds to a function performed by the portable apparatus 100. At least one speaker 163 may be positioned in an appropriate position of each of the first and second housings 100a and 100b or in positions of both the first and second housings 100a and 100b. For example, as illustrated in FIGS. 1A and 1B, a plurality of speakers 163a through 163f are positioned on the front and back sides of the first and second housings 100a and 100b.

Figure 11A:
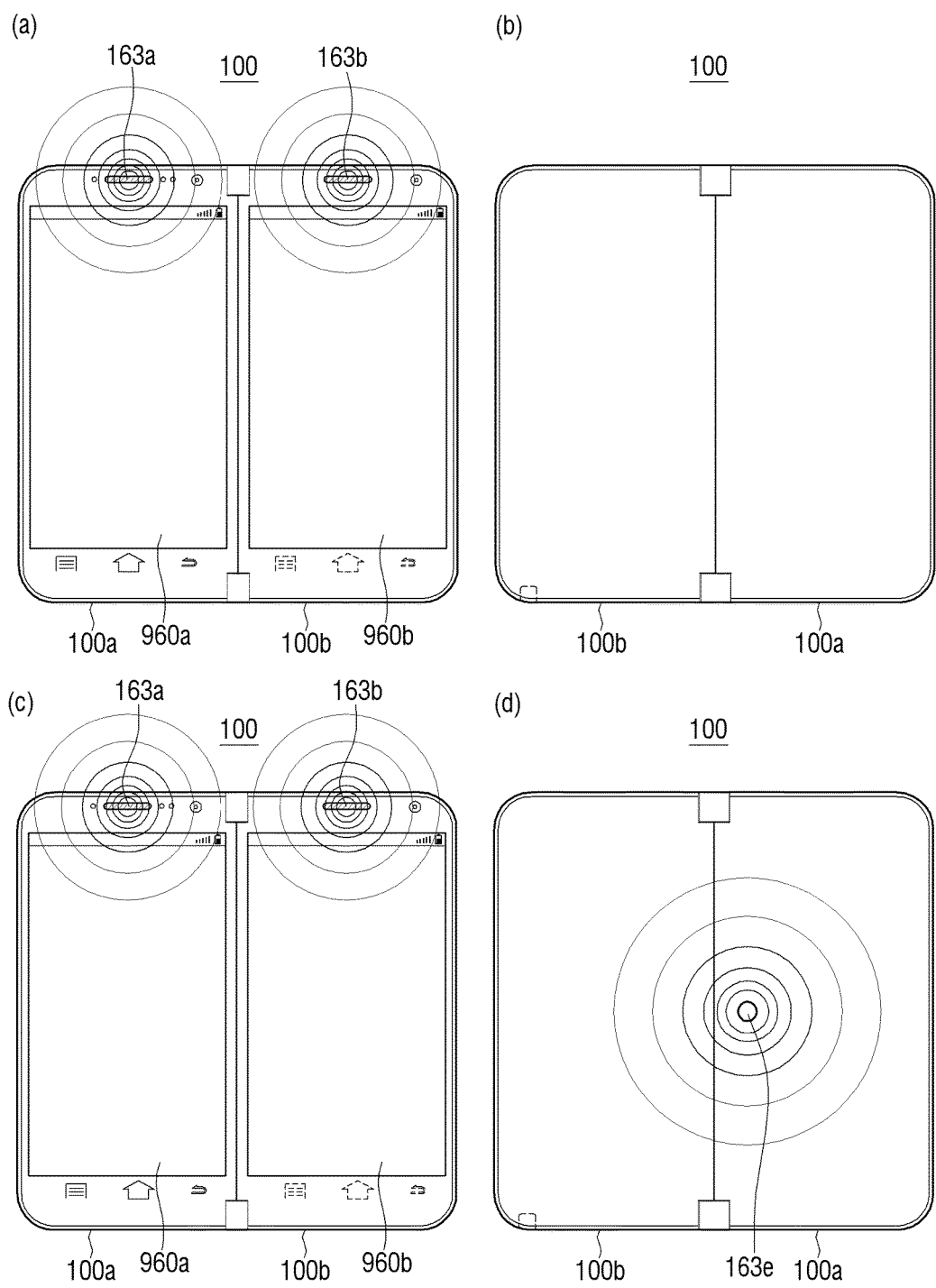
FIGS. 11A and 11B are views illustrating methods of outputting a sound of a portable apparatus according to other exemplary embodiments of the present general inventive concept.

As is described below with reference to FIG. 11A, speakers 163a and 163b may be positioned, respectively, on front sides of the first and second housings 100a and 100b. Alternatively, as illustrated in FIG. 11A, the speakers 163a and 163b may be positioned on the front sides of the first and second housings 100a and 100b and one speaker 163e may be positioned on the back sides of the first and second housings 100a and 100b.

The speaker 163 may be positioned on at least one of four sides (for example, upper, lower, left, and right sides) of each of the first and second housings 100a and 100b that connect the front and back sides of the first and second housings 100a and 100b. The portable apparatus 100 that has speakers 163 on the front sides, the sides, and the back sides of the first and second housings 100a and 100b may provide various sound output effects compared to when speakers 163 are positioned only on the front and back sides of the first and second housings 100a and 100b.

According to an exemplary embodiment of the present general inventive concept, the speaker 163 may output a sound according to an output mode that may be determined based on an angle between the first and second touch screens 190a and 190b and a property of an executed application. Here, the output mode may refer to control information about an on/off state of sound outputs of a plurality of speakers, a volume control, a sound source to be output, etc.

The vibration motor 164 may be controlled by the controller 110 to convert an electrical signal into a mechanical vibration. For example, if a voice call is received from another portable apparatus (not illustrated), the portable apparatus 100 that is in a vibration mode may operate the vibration motor 164. One vibration motor 164 or a plurality of vibration motors 164 may be positioned, for example, in the first and second housings 100a and 100b of the portable apparatus 100. For example, at least one or more vibrator motor 164 may be positioned only in the first housing 100a, only in the second housing 100b, or in both of the first and second housings 100a and 100b.

According to an exemplary embodiment of the present general inventive concept, the vibration motor 164 may operate in response to sounds output from a plurality of speakers according to an output mode that may be determined based on an angle of the first and second touch screens 190a and 190b and an property of an executed application.

The connector 165 may be used as an interface that connects the portable apparatus 100 to an external apparatus (not illustrated) or a power source (not illustrated). Under control of the controller 110, the connector 165 may transmit data stored in the storage unit 175 of the portable apparatus to the external apparatus through a cable connected to the connector 165 or may receive data from the external apparatus through the cable. Power may be input from the power source through the cable connected to the connector 165 or a battery may be charged by the power source through the cable.

The keypad 166 may receive a key input from the user to control the portable apparatus 100. The keypad 166 may include, for example, a physical keypad (not illustrated) that may be formed in the portable apparatus 100, or a virtual keypad (not illustrated) that may displayed on at least one of the first and second touch screens 190a and 190b. The physical keypad formed at the portable apparatus 100 may be excluded from the portable apparatus 100 according to a performance requirement or a structure of the portable apparatus 100.

The input unit 167 may include, for example, touch menus, icons, input characters, and/or figures displayed on the first and second touch screens 190a and 190b of the portable apparatus 100. For example, the input unit 167 may touch a touch screen (not illustrated) using a capacitive method, a resistance method, and/or an electromagnetic induction method or may input characters, etc. For example, the input unit 167 may be a stylus pen (not illustrated) or a haptic pen (not illustrated) that vibrates an internal actuator (not illustrated) by using a command received from the short range communication unit 132 of the portable apparatus 100. The internal actuator may vibrate by using sensing information detected by a sensor (not illustrated) of the haptic pen rather than the command received from the portable apparatus 100.

The sensor unit 170 may include at least one sensor that detects a state of the portable apparatus 100. For example, the sensor unit 170 may include the proximity sensor 171, the angle sensor 172, an illumination sensor (not illustrated), and/or a motion sensor (not illustrated). The proximity sensor 171 may be positioned, for example, on the top of the front side of the portable apparatus 100 with respect to the user and may detect a proximity of the user to the portable apparatus 100. The angle sensor 172 may detect an angle formed between the first and second housings 100a and 100b. The illumination sensor may detect an amount of light around the portable apparatus 100, and the motion sensor may detect an operation of the portable apparatus 100 (for example, a rotation of the portable apparatus 100, an acceleration and/or a vibration applied to the portable apparatus 100, or the like).

The angle sensor 172 may be positioned, for example at the hinges 100c1, 100c2, or 100c3 of the portable apparatus 100 to detect an angle formed between the first and second housings 100a and 100b and may transmit angle information that corresponds to the detected angle to the controller 110. The detected angle may be, for example. an angle from 0° to 360°. The angle sensor 172 may be realized, for example, as a geomagnetic sensor or a gyro sensor. The angle sensor 172 may include, for example, a hinge type angle sensor (not illustrated) that rotates by an angle formed between the first and second housings 100a and 100b. The angle sensor 172 may measure an angle between the first and second touch screens 190a and 190b that may be positioned in one flexible housing (not illustrated). In an embodiment of the present inventive concept that uses a flexible housing, an angle may be measured, for example, by using a bending sensor or a pressure sensor.

At least one sensor of the sensor unit 170 may detect a state of the portable sensor 100, may generate a signal that corresponds to the detected state, and may transmit the signal to the controller 110. Sensors of the sensor unit 170 may be added or removed according to the performance requirement of the portable apparatus 100.

The storage unit 175 may be controlled by the controller 110 to store a signal or data that may be input/output to correspond to an operation, for example, of the mobile communication unit 120, the sub communication unit 130, the multimedia unit 140, the camera unit 150, the GPS unit 155, the input/output unit 160, the sensor unit 170, the first touch screen 190a, and/or the second touch screen 190b. The storage unit 175 may store a control program that controls the portable apparatus 100 or the controller 110 and an application program that may be provided from a manufacturer or may be downloaded from an external source.

The term "storage unit" used herein may include the storage unit 175, the ROM 112 and the RAM 113 of the controller 110, and/or a memory card (not illustrated) (for example, a secure digital (SD) card, a memory stick, or the like) installed in the portable apparatus 100. The storage unit may include, for example, a nonvolatile memory, a volatile memory, a hard disk drive (HDD), and/or a solid state drive (SSD).

The power supply unit 180 may be controlled by the controller 110 to supply power to one battery or a plurality of batteries (not illustrated) positioned in at least one of the first and second housings 100a and 100b. The one battery or the plurality of batteries may be positioned, for example, between the first and second touch screens 190a and 190b positioned on the front sides of the first and second housings 100a and 100b and/or on the back sides of the first and second housings 100a and 100b. The power supply unit 180 may supply the portable apparatus 100 with power that is input from an external power source (not illustrated) through a cable connected to the connector 165.

The first and second touch screens 190a and 190b may provide the user with user interfaces (UIs) that correspond to various services (for example, a call, a data transmission, broadcasting, photo capturing, a video, an application, etc.). The first and second touch screens 190a and 190b may transmit an analog signal that corresponds to one touch or a plurality of touches input through the UIs to touch screen controllers 195, 195a (see FIG. 4), or 195b (see FIG. 4). A signal transmitted to the touch screen controllers 195, 195a, or 195b may be transmitted to the controller 110. The first and second touch screens 190a and 190b may receive one touch or a plurality of touches through a body of the user or a touchable object (for example, the input unit 167).

In the present general inventive concept, the touch is not limited to a contact between the first and second touch screens 190a and 190b and the body of the user or the touchable object, but may include a communication with at least one of the first and second touch screens 190a and 190b realized through a method other than physical contact (for example, a detectable distance between the body of the user or the touchable object and the first and second touch screens 190a and 190b that is less than or equal to 3 mm.). A distance at which a communication through a method other than physical contact that may be detectable from the first and second touch screens 190a and 190b may be changed according to the performance requirement or the structure of the portable apparatus 100.

The first and second touch screens 190a and 190b may be realized, for example, as resistive types, capacitive types, infrared types, and/or acoustic wave types.

The touch screen controller 195 may convert an analog signal corresponding to the one touch or the plurality of touches received from the first and second touch screens 190a and 190b into a digital signal (for example, X and Y coordinates corresponding to a touch position) and may transmit the digital signal to the controller 110. The controller 110 may control the first and second touch screens 190a and 190b by using the digital signal received from the touch screen controller 195. For example, the controller 110 may display that a shortcut icon (not illustrated) displayed on the first and second touch screens 190a and 190b has been selected in response to the input touch or may execute an application that corresponds to the selected shortcut icon. The controller 110 may calculate the X and Y coordinates that correspond to the touch position by using the digital signal received from the touch screen controller 195. According to an exemplary embodiment of the present general inventive concept, one touch screen controller 195 may control one touch screen 190a or 190b or a plurality of touch screens 190a and 190b. Alternatively, a plurality of touch screen controllers (not illustrated) may control one touch screen 190a or 190b. The touch screen controller 195 may be included, for example, in the controller 110 according to the performance requirement or the structure of the portable apparatus 100.

The term "touch screen controller" used herein may include the touch screen controller 195, a first touch screen controller 195a (see FIG. 4), and/or a second touch screen controller 195b (see FIG. 4).

FIG. 4 is a schematic block diagram illustrating the portable apparatus 100 according to another exemplary embodiment of the present general inventive concept.

Referring to FIG. 4, the portable apparatus 100 may include a first controller 110a, a second controller 110b, the first touch screen controller 195a, and the second touch screen 195b. The other elements of the portable apparatus 100 may be the same as those of the portable apparatus 100 illustrated in FIG. 3. Therefore, repeated descriptions are omitted.

The first controller 110a may include a first application processor (AP) 111a, a first ROM 112a, and a first RAM 113a. The first ROM 112a may store a control program that controls the portable apparatus. The first RAM 113a may store a signal or data input from outside of the portable apparatus 100 or may be used as a storage area with respect to an operation performed by the portable apparatus 100.

The first controller 110a may control, for example, the mobile communication unit 120, the sub communication unit 130, the multimedia unit 140, the camera unit 150, the GPS unit 155, the input/output unit 160, the sensor unit 170, the storage unit 175, the power supply unit 180, the first touch screen 190a, and the first touch screen controller 195a.

The first touch screen controller 195a may convert an analog signal that corresponds to one touch or a plurality of touches received from the first touch screen 190a into a digital signal (for example, X and Y coordinates) and may transmit the digital signal to the first controller 110a. The first controller 110a may control the first touch screen 190a by using the digital signal received from the first touch screen controller 195a. The first touch screen controller 195a may be included, for example, in the first controller 110a.

The second controller 110b may include a second application processor (AP) 111b, a second ROM 112b, and a second RAM 113b. The second ROM 112b may store a control program that controls the portable apparatus. The second RAM 113b may store a signal or data input from outside of the portable apparatus 100 or may be used as a storage area with respect to an operation performed by the portable apparatus 100.

The second controller 110b may control, for example, the mobile communication unit 120, the sub communication unit 130, the multimedia unit 140, the camera unit 150, the GPS unit 155, the input/output unit 160, the sensor unit 170, the storage unit 175, the power supply unit 180, the second touch screen 190b, and the second touch screen controller 195b.

The second touch screen controller 195 may convert an analog signal that corresponds to one touch or a plurality of touches received from the second touch screen 190b into a digital signal (for example, X and Y coordinates) and may transmit the digital signal to the second controller 110b. The second controller 110b may control the second touch screen 190b by using the digital signal received from the second touch screen controller 195b. The second touch screen controller 195b may be included, for example, in the second controller 110b.

According to an exemplary embodiment of the present general inventive concept, the first controller 110a may control at least one element (for example, the first touch screen 190a, the first touch screen controller 195a, the mobile communication unit 120, the sub communication unit 130, the multimedia unit 140, the first camera 151, the GPS unit 155, the first button group 161a, a power/lock button (not illustrated), at least one volume button (not illustrated), the sensor unit 170, the storage unit 175, and/or the power supply unit 180) that may be disposed in the first housing 100a in which the first controller 110a may be positioned.

The second controller 110b may control at least one element (for example, the second touch screen 190b, the second touch screen controller 195b, the second camera 152, the second button group 16b, the storage unit 175, and/or the power supply unit 180) that may be positioned in the second housing 100b in which the second controller 110b may be positioned.

According to an exemplary embodiment of the present general inventive concept, the first and second controllers 110a and 110b may control the elements of the portable apparatus 100 per unit. For example, the first controller 110 may control the mobile communication unit 120, the sub communication unit 130, and the input/output unit 160, and the second controller 110b may control the multimedia unit 140, the camera unit 150, the GPS unit 155, and the sensor unit 170. The first and second controllers 110a and 110b may control the elements of the portable apparatus 100 according to priorities. (For example, the first controller 110a may prioritize the mobile communication unit 120, and the second controller 110b may prioritize the multimedia unit 140.) The first and second controllers 110a and 110b may be separately positioned in the first and second housings 100a and 100b, but may be alternatively positioned in only one of the first housing 100a and the second housing 100b. The first and second controllers 110a and 110b may be realized, for example, as one controller (not illustrated) that has an application processor (AP) with a plurality of cores, such as a dual core.

Figure 13:
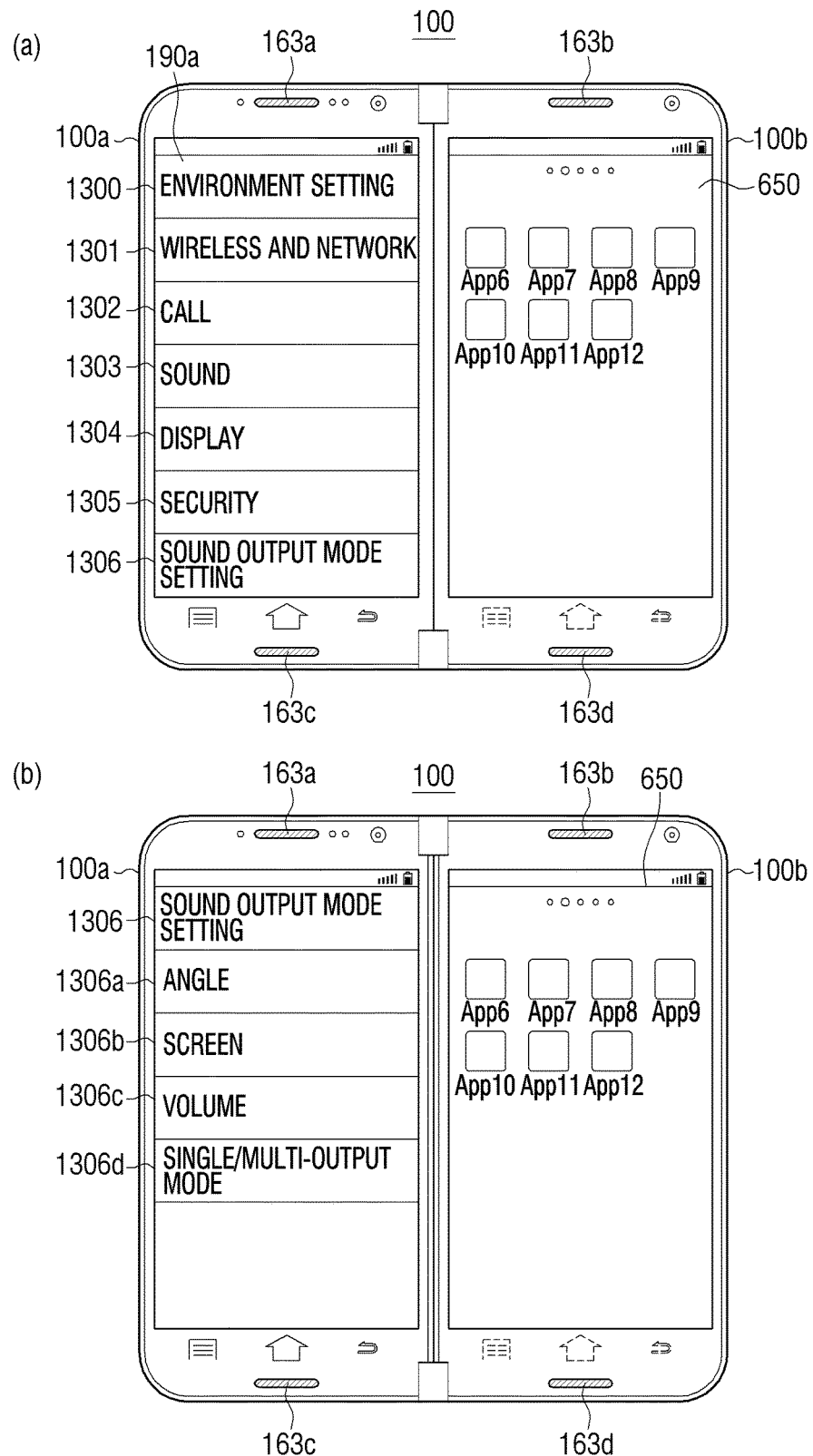
FIG. 13 includes views illustrating setting of a sound output mode according to exemplary embodiments of the present general inventive concept.

Referring to FIG. 13, control priorities of the first and second controllers 110a and 110b may be changed by selecting a controller priority item (not illustrated) of an environment setting 1300. For example, the first controller 110a may prioritize the mobile communication unit 120.

Referring to FIGS. 1 through 4, the first touch screen 190a may be positioned in the first housing 100a, and the second touch screen 190b may be positioned in the second housing 100b. However, both of the first and second touch screens 190a and 190b may be positioned in one housing (not illustrated). In an embodiment of the present inventive concept that uses the one housing, a distance may be formed between the first and second touch screens 190a and 190b to detect an angle between the first and second touch screens 190a and 190b.

The one housing may include a flexible housing. The flexible housing may include a flexible display. The flexible housing and/or the flexible display may include some of the elements 110 through 195 illustrated in FIGS. 3 and 4. The elements of the flexible display may be the same as or similar to those of the portable apparatus 100, and thus repeated descriptions are omitted.

Figure 14:
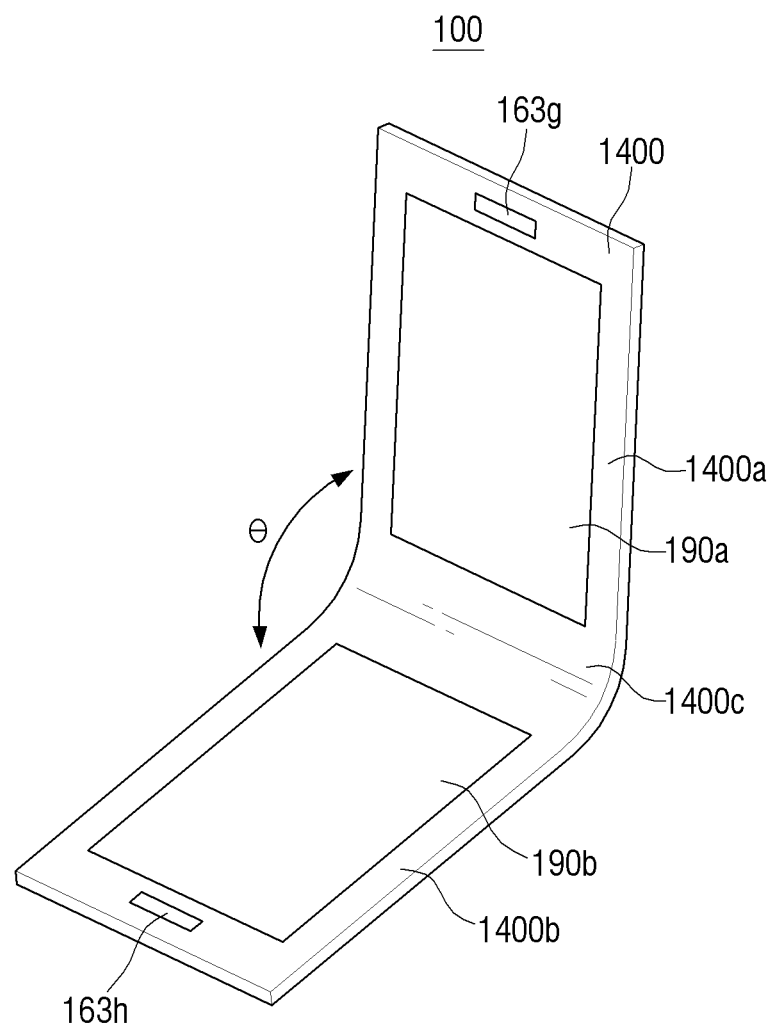
FIG. 14 is a perspective view illustrating a portable apparatus according to an exemplary embodiment of the present general inventive concept.

FIG. 14 is a perspective view illustrating the portable apparatus 100 according to an exemplary embodiment of the present general inventive concept. Referring to FIG. 14, the portable apparatus 100 may have a plurality of touch screens and a plurality of speakers and may include a flexible housing. Here, a flexible housing 1400 may be made of a flexible plastic. The flexible housing 1400 may include a first portion 1400a and a second portion 1400b. The first portion 1400a and the second portion 1400b may be connected at a third portion 1400c of the flexible housing 1400 to perform a hinge function. The third portion 1400c may be bendable so that a position of a portion of the first portion 1400a with respect to a portion of the second portion 1400b may be expressed in terms of an angle θ formed between the first portion 1400a and the second portion 1400b at or near the third portion 1400c. The angle θ may have a range from 0° to 360°. A measure of the angle θ may be detected by any of several sensors including, but not limited to, a geometric sensor, a gyro sensor, a bending sensor, and/or a pressure sensor. The first portion 1400a may include the first touch screen 190a. The first touch screen 190a may be a rigid display and/or a flexible display. The second portion 1400b may include the second touch screen 190b. The second touch screen 190b may be a rigid display and/or a flexible display. The first portion 1400a may include at least one first speaker 163g electrically connected to a controller thereof. The second portion may include at least one second speaker 163h electrically connected to a controller thereof.

FIG. 5 is a flowchart illustrating a method of outputting a sound of a portable apparatus according to an exemplary embodiment of the present general inventive concept. FIGS. 6A and 6B are views illustrating a method of outputting a sound of the portable apparatus 100 according to an exemplary embodiment of the present general inventive concept.

A method of outputting a sound according to an exemplary embodiment of the present inventive concept is described with reference to FIGS. 5 through 6B.

In operation S501, one shortcut icon or a plurality of shortcut icons may be displayed on a first touch screen of a first housing. For example, referring to a view (a) of FIG. 6A, a first screen 600 may be displayed on the first touch screen 190a.

The first screen 600 may include a first status bar 601 and a first shortcut icon display area 602. The first status bar 601 may display a status of the portable apparatus 100 such as, for example, a charge state 601a of a battery, an intensity 601b of a received signal of a portable phone, or a vibration mode icon (not illustrated). The first status bar 601 may display, for example, an icon that indicates whether a plurality of touch screens 190a and 190b of the portable apparatus 100 are operating, such as a dual mode icon (not illustrated). The dual mode icon may be realized, for example, as a text. The first shortcut icon display area 602 may display a shortcut icon that corresponds to at least one application executable in the portable apparatus 100.

The status bar 601 may not be displayed on the first screen 600, according to an operating system (OS) or an application of the portable apparatus 100. If the status bar 601 is not displayed, only the first screen 600 may be displayed on the first touch screen 190a. The application of the portable apparatus 100 may include, for example, a messenger application, a web browser application, a video player application, an audio player application, a Social Networking Service (SNS) application, or the like. The application executable in the portable apparatus 100 may include, for example, an application and a widget that may be downloaded from an online market or may be provided by a manufacturer of the portable apparatus 100 or a communications firm.

If, for example, a friends' list or a time line provided in the messenger application is longer than at least one of horizontal lengths and vertical lengths of at least one of the first and second touch screens 190a and 190b, the friends' list or the time line may be provided in a plurality of screens. If a size of a webpage currently displayed on a web browser is longer than at least one of the horizontal and the vertical lengths of at least one of the first and second touch screens 190a and 190b, the displayed web page may be divided to correspond to the lengths of the first and second touch screens 190a and 190b in order to be provided in a plurality of screens. If, in the SNS application, the time line is longer than the first and second touch screens 190a and 190b, the time line may be provided in a plurality of screens.

Examples of applications providing a plurality of screens are easily understood by those skilled in the art in light of the descriptions included herein.

A second screen 650 may be displayed on the second touch screen 190b. The second screen 650 may display, for example, a second status bar 651 that displays a status of the portable apparatus 100, and a second shortcut icon display area 652 that displays a plurality of shortcut icons App6 through App12 that may be a continuation of the shortcut icons displayed in the first shortcut icon display area 602. The second screen 650 may be, for example, the same as or similar to the first screen 600, and thus a repeated description thereof is omitted.

In operation S502 of FIG. 5, a touch of the shortcut icon may be detected. For example, referring to the view (a) FIG. 6A, a user may perform a touch 605 (for example, by a tap) of a shortcut icon for a first application 602a displayed on the first touch screen 190a. The controller 110 may detect the touch 605 of the user on the first touch screen 190a through the first touch screen 190a and at least one of the touch screen controller 195, the first touch screen controller 195a, and the second touch screen controller 195b. The controller 110 may receive position information (for example, X and Y coordinates) that correspond to an initial position of the touch 605 on the first screen 600 from at least one of the touch screen controller 195, the first ouch screen controller 195a, and the second touch screen controller 195b.

For example, the controller 110 may store the position of the touch 605 on the first touch screen 190a, a touch detection time (for example, 10:05 AM), and touch information that corresponds to the touch 605 in the storage unit 175. Here, the position of the touch 605, the touch detection time, and the touch information may be included in the received position information. The touch 605 on the first touch screen 190a may occur through one of the fingers, including the thumb, or the input unit 167, which may be touchable.

The number of touches 605 that may be detected from the first touch screen 190a may not be limited to one, but a plurality of continuous touches (for example, double taps) may be detected from the first touch screen 190a. If the plurality of continuous touches are detected from the first touch screen 190a, the controller 110 may store a plurality of positions of the touches 605 and a plurality of touch detection times of the plurality of touches 605 in the storage unit 175. The number of detected touches is easily understood by those skilled in the art in light of the descriptions included herein.

In operation S503 of FIG. 5, an application that corresponds to the shortcut icon may be executed. For example, referring to a view (b) of FIG. 6A, the controller 110 may execute an application (for example, a reader's hub 610) that corresponds to the touch 605 on the first touch screen 190a.

A first screen 610a of the executed reader's hub 610 may display various types of contents. The various types of contents may include, for example, some of an Ebook 611a, a Newspaper 611b, a Report 611c, a Magazine 611d, and Comics 611e.

The controller 110 may display a list of Ebooks 611a stored in the storage unit 175 on a second screen 610b. The second screen 610b may display the list of Ebooks 611a, a list of Newspapers 611b that are read or stored in the storage unit 175, a list of Reports 611c that are stored in the storage unit 175, a list of Magazines 611d that are read or stored in the storage unit 175, and a list of Comics 611e that are stored in the storage unit 195. For example, contents 611a through 611e of the reader's hub 610 may include a text, an image file, an audio file (for example, an audio source), a video file, user input information, etc. A plurality of texts, a plurality of audio sources, a plurality of video files, and a plurality of pieces of user input information may be included, for example, in the contents 611a through 611e.

For example, the user input information may include a memo, a handwriting, a highlight, or a bookmark that may be input by using the body of the user (for example, the fingers including the thumb) or the input unit 167.

A property of the application may be acquired by using information stored, for example, in "androdmanifest.xml". For example, there may be acquired information about a title of the application, a library used in the application, an android version of the application, an application permission, a resolution supported in the application, an application component (for example, an activity or a service).

In operation S504 of FIG. 5, a content may be executed in the application. For example, referring to the view (b) of FIG. 6A, the controller 110 may detect a touch 613 of the user on the second touch screen 190b through the second touch screen 190b and at least one of the touch screen controller 195, the first touch screen controller 195a, and the second touch screen controller 195b. The controller 110 may receive position information (for example, X and Y coordinates) corresponds to an initial position of the touch 613 on the second screen 650 from at least one of the touch screen controller 195, the first touch screen controller 195a, and the second touch screen controller 195b.

The controller 110 may store the position of the touch 613 on the second touch screen 190b, the touch detection time (for example, 10:07 AM)-, and the touch information that corresponds to the touch 613 in the storage unit 175. Here, the position of the touch 613, the touch detection time, and the touch information may be included in the received position information. The touch 613 on the second touch screen 190b may occur through one of the fingers, including the thumb, or the input unit 167.

Referring to a view (a) of FIG. 6B, the controller 110 may execute a content (for example, Ebook "Stroll" 612) that corresponds to the touch 613 on the second touch screen 190b. For example, two pages may be displayed on the first and second touch screens 190a and 190b, according to a preset setting (for example, a dual page mode), that correspond to the executed "Stroll" 612. If "Stroll" 612 is initially executed, a first page of "Stroll" 612 may be displayed on the first screen 612a of the first touch screen 190a, and a second page may be displayed as a second page on the second screen 612b of the second touch screen 190b. If "Stroll" 612 is executed a plurality of times, the second page that has been most recently displayed, for example, may be displayed again. If "Stroll" is executed, only one page may be displayed on one of the first and second screens 612a and 612b. Alternatively, if "Stroll" 612 is executed, the same page may be displayed on both the first and second screens 612a and 612b.

A filename extension of the content "Stroll" 612 may include, for example, txt, kf8, html, pdf, azw, cbr, or cbz. It is easily understood by those skilled in the art in light of the descriptions included herein that there may be many filename extensions supported by embodiments of the present inventive concept. There may be a filename extension (for example, epub, html, azw, or pdf) that may support a sound and a filename extension (for example, pdb or txt) that may not support a sound. In the present general inventive concept, a filename extension executable in an application may be set to be executable in the application and may refer to information that identifies various types of contents. Filename extension information that corresponds to the filename extension executable in the application may be stored in an additional file. A filename extension of a content may refer to information that identifies whether the content is executable in an executed application. The filename extension information that corresponds to the filename extension of the content may be stored in an additional file.

The Ebook "Stroll" 612 may include, for example, a plurality of texts, a plurality of audio sources, a plurality of video files, and/or a plurality of pieces of user input information. The Ebook "Stroll" 612 may include, for example, one audio source that corresponds to a whole page of the Ebook "Stroll" 612. An image 612a1 may be displayed on the first screen 612a displayed on the first touch screen 190a. The first screen 612a may include, for example, the image 612a1 and one audio source or a plurality of audio sources that correspond to the first screen 612a.

User input information may be added on the first screen 612a. The audio source may be output as a sound by the controller 110 through a codec unit (not illustrated) and the speaker 163 (see FIGS. 3 and 4).

A text 612b1 may be displayed on the second screen 612b displayed on the second touch screen 190b. The second screen 612b may include, for example, the text 612b1 and one audio source or a plurality of audio sources that correspond to the second screen 612b.

In operation S505 of FIG. 5, an angle between first and second housings 100a and 100b may be detected. For example, referring to the view (a) of FIG. 6B, the controller 110 may detect an angle between the first and second housings 100a and 100b by using the angle sensor 172 (see FIGS. 3 and 4). For example, the detected angle may be within a range between 0° and 360° (for example, an error of the angle may include a range of)±2°. Referring to a view (a) of FIG. 6B, the angle detected between the first and second housings 100a and 100b is 180°. The angle between the first and second housings 100a and 100b may be an input by the user rather than an input by the angle sensor 172. For example, the user may select objects (for example, an icon, a text, or the like) that correspond to various shape states of the portable apparatus 100 displayed on the first and second touch screens 190a and 190b. An object that corresponds to a folded state of the portable apparatus 100 may indicate that the angle between the first and second housings 100a and 100b is, for example, 0°. An object that corresponds to an unfolded state of the portable apparatus 100 may indicate that the angle between the first and second housings 100a and 100b is, for example, 180°. An object that corresponds to a triangular desk calendar (not illustrated) of the portable apparatus 100 may indicate that the angle between the first and second housings 100a and 100b is, for example, 60°. An object that corresponds to a notebook PC (not illustrated) on which the portable apparatus 100 may be operating may indicate that the angle between the first and second housings 100a and 100b is, for example, 210°. The portable apparatus 100 may be rotated by the hinge 100c1, 100c2, or 100c3 (see FIG. 2) at an angle from 0° to 360°, and thus the user may select objects that correspond to various statuses of the portable apparatus 100 on the first and second touch screens 190a and 190b.

In the present general inventive concept, it is easily understood by those skilled in the art in light of the descriptions included herein that the detection of the angle between the first and second housings and may be performed in any of operations S501 through S504.

In operation S506 of FIG. 5, the number of output speakers may be determined. For example, the controller 110 may determine the number of output speakers 163 (see FIGS. 3 and 4) in an executed content (for example, "Stroll" 612) by using parameters that correspond to the number of output speakers 163. For example, the controller 110 may extract channel numbers from a channel_configuration header of a content to determine the number of speakers 163. The determined number of speakers 163 may include, for example, one, two, three, four, five, six, eight, or more. An output mode may be determined according to the determined number of output speakers 163. For example, a sound may be output through one of a 1 channel (for example, one speaker 163), a 2 channel (for example, two speakers 163), a 2.1 channel (for example, two speakers 163 and one woofer speaker 163), a 4 channel (for example, four speakers 163), a 5.1 channel (for example, four speakers 163, one woofer speaker 163, and one center speaker 163), a 7 channel (for example six speakers 163, one woofer speaker 163, and one center speaker 163), or a 7 or more channel (for example, seven or more speakers 163, a plurality of woofer speakers 163, or a plurality of center speakers 163). A channel may output different signals, which may be input into speakers 163 from an audio source, respectively, through the number of speakers 163 as sounds. In an exemplary embodiment of the present inventive concept, the determined number of speakers 163 is six.

The controller 110 may recognize the number of speakers 163 installed in the portable apparatus 100. For example, the controller may recognize the number of speakers 163 installed in the portable apparatus 100 with reference to configuration information stored in the storage unit 175 of the portable apparatus 100. The controller 110 may control to output a sound by using the number of speakers 163 installed in the portable apparatus 100 and the number of speakers 163 extracted from an audio source.

In operation S507 of FIG. 5, the controller 110 may determine whether the portable apparatus 100 is in a single output mode. For example, the controller 110 may determine the number of audio sources that may be included in pages displayed on the first and second screens 612a and 612b. The controller 110 may determine, according to the determined number of audio sources, whether the portable apparatus 100 is in the single output mode. For example, if the number of audio sources is one, the controller 110 may determine an output mode of the portable apparatus 100 to be the single output mode. The single output mode may be to output one audio source that corresponds to an executed content as a sound.

If the portable apparatus 100 is not in the single output mode, the controller 110 may proceed to operation S509.

In operation S508 of FIG. 5, the controller 110 may output one audio source as a sound through speakers 163 that correspond to the determined number of speakers 163. For example, referring to views (b) and (c) of FIG. 6B, the portable apparatus 100 may include a total of six speakers 163 (for example, a 5.1 channel). For example, the first speaker 163a may be positioned on the top of the front side of the first housing 100a, and the second speaker 163b may be positioned on the bottom of the front side of the first housing 100a, and the fifth speaker 163e, a woofer speaker, may be positioned in the central area of the back side of the first housing 100a. The third speaker 163c may be positioned on the top of the front side of the second housing 100b, the fourth speaker 163d may be positioned on the bottom of the front side of the second housing 100b, and the sixth speaker 163f, a center speaker, may be positioned in the central area of the back side of the second housing 100b.

The controller 110 may control to output one audio source as a sound through a plurality of speakers 163 according to the single output mode based on an angle between the first and second housings 100a and 100b detected by using the angle sensor 172 (see FIG. 3 and), and a property of an executed application (for example, at least one of a title of the application, a content executable in the application, and a content executed in the application).

For example, if the detected angle is 180°, the title of the executed application is the reader's hub 610, and a filename extension of the executed content is epub, the controller 110 may control a plurality of speakers 163 and a codec unit (not illustrated) to output a sound through a 5.1 channel and six speakers 163 in the single output mode. For example, the controller 110 may control the six speakers 163 to output the sound or to increase or decrease the volume to correspond to status information (for example, battery low, on the phone) of the portable apparatus 100, which may be received from the sensor unit 170 or surrounding status information (for example, if noise measured by using a microphone is greater than a preset level of 80 db) of the portable apparatus 100.

The controller 110 may provide, for example, a haptic feedback to the user by using the vibration motor 164 in response to the sound output through the plurality of speakers 163 in the single output mode. For example, the controller 110 may variously control the vibration motor 164 (for example, a strength of a vibration and a duration time of a vibration) according to at least one of a pitch, dynamics, and a tone of a sound output through speakers 163 to provide the haptic feedback to the user. The controller 110 may control to maintain the haptic feedback until the sound is completely output.

The filename extension of the content may include, for example, txt, kf8, html, pdf, azw, cbr, or cbz. It is easily understood by those skilled in the art in light of the descriptions included herein that there may be many filename extensions supported by embodiments of the present inventive concept. Also, there may be filename extensions (for example, epub, html, azw, or pdf) that support a sound content and there may be filename extensions (for example, pdb or txt) that support a content other than sound.

An output mode may be classified, for example, into a single output mode and a multi-output mode according to an audio source. The output may include at least one of on/off of outputting sounds through a plurality of speakers 163 and a volume control. For example, the output mode may be to control only the on/off of outputting sounds through a plurality of speakers 163, only the volumes of the plurality of speakers 163, the on/off of outputting a sound through one or more of the plurality of speakers 163, and the volumes of one or more of the plurality of speakers 163. The output mode may include, for example, an audio system that is formed for a 1 channel, a 2 channel, a 2.1 channel, a 4 channel, a 5.1 channel, and/or a 7 or more channel. A determination of the output mode, according to an audio source, as one of the single output mode and the multi-output mode may be performed in operations S507 and S509.

In operation S508 of FIG. 5, if sounds are output through a plurality of speakers 163 according to the single output mode based on the angle detected by using the angle sensor 172 and the property of the executed application, the controller 110 may conclude the method.

If the portable apparatus 100 is not in the singe output mode in operation S507, the controller 110 may proceed to operation S509.

In operation S509 of FIG. 5, the controller 110 may determine whether the portable apparatus 100 is in the multi-output mode. For example, the controller 110 may determine the number of audio sources included in content displayed on the first and second screens 612a and 612b. The controller 110 may determine whether the portable apparatus 100 is in the single output mode or the multi-output mode according to the determined number of audio sources. For example, if there are a plurality of audio sources, the controller 110 may determine the output mode of the portable apparatus 100 as the multi-output mode. The multi-output mode may be to output a plurality of audio sources that correspond to an executed content as sounds.

If the output mode of the portable apparatus 100 is not the multi-output mode, the controller 110 may conclude the method.

In operation S510 of FIG. 5, the controller 110 may output a plurality of audio sources as sounds through speakers 163 that correspond to the determined number of speakers 163. For example, referring to the views (b) and (c) of FIG. 6B, in the portable apparatus 100, the first speaker 613a may be positioned on the top of the front side of the first housing 100a, the second speaker 163b may be positioned on the bottom of the front side of the first housing 100a, and the fifth speaker 163e, a woofer speaker, may be positioned in the central area of the back side of the first housing 100a. The third speaker 163c may be positioned on the top of the front side of the second housing 100b, the fourth speaker 163d may be positioned on the bottom of the front side of the second housing 100b, and the sixth speaker 163f, a center speaker, may be positioned in the central area of the back side of the second housing 100b.

The controller 110 may output the plurality of audio sources as the sounds through the plurality of speakers 163 according to the multi-output mode based on the angle between the first and second housings 100a and 100b detected by using the angle sensor 172 and the property of the executed application (for example, at least one of the title of the application, the content executable in the application, and the content executed in the application).

For example, the controller 110 may control to output a first audio source as a sound through the three speakers 163a, 163b, and 163e positioned in the first housing 100a. In this case, the portable apparatus 100 may provide the same effect as that of outputting a sound through a 2.1 channel in the single output mode. The controller 110 may control to output a second audio source as a sound through the three speakers 163c, 163d, and 163f positioned in the second housing 100b. In this case, the portable apparatus 100 may provide the same effect as that of outputting a sound through a 2.1 channel in the single output mode. In the multi-output mode using a plurality of audio sources, the portable apparatus 100 may be provided an effect of outputting a sound through two 2.1 channels.

If the detected angle is 180°, the title of the executed application is a reader's hub 610, and the filename extension of the executed content is epub, the controller 110 may control a plurality of speakers 163 and a codec unit (not illustrated) to output a sound through a 5.1 channel and six speakers in the multi-output mode. For example, the controller 110 may control to output a sound through six speakers 163 or to increase or decrease the volume to correspond to status information (for example, a battery low or on the phone) of the portable apparatus 100, which may be received from the sensor unit 170 or surrounding status information of the portable apparatus 100 (for example, if noise measured by using a microphone is greater than a preset level of 80 db).

The controller 110 may provide, for example, a haptic feedback to the user by using the vibration motor 164 in response to outputting of a sound through a plurality of speakers 163 in the multi-output output mode. For example, the controller 110 may variously control the vibration motor 164 according to at least one of a pitch, dynamics, and a tone of a sound output through speakers 163 to provide the haptic feedback. The controller 110 may control to maintain the haptic feedback until the sound is completely output.

In operation S510 of FIG. 5, if sounds are output through a plurality of speakers 163 in the multi-output mode based on the angle detected by using the angle sensor 170 and the property of the executed application, the controller 110 may conclude the method.

FIG. 7 includes views illustrating a method of outputting the sound of a portable apparatus 100 according to another exemplary embodiment of the present general inventive concept.

In operation S501 of FIG. 5, one shortcut icon or a plurality of shortcut icons may be displayed on a first touch screen of a first housing.

Operation 501 of FIG. 5 may be performed in the present exemplary embodiment of the present inventive concept in a manner that may be equivalent to operation S501 of FIG. 5 performed in the previous exemplary embodiment of the present inventive concept, and thus a repeated description thereof is omitted.

In operation S502, a touch may be detected from the shortcut icon.

Referring to a view (a) of FIG. 7, a user may perform a touch 615 (for example, by a tap) of a shortcut icon for a first application 620 displayed on the first touch screen 190a. The controller 110 may detect the touch 615 of the user on the first touch screen 190a through the first touch screen 190a and at least one of the touch screen controller 195, the first touch screen controller 195a, and the second touch screen controller 195b. The controller 110 may receive position information (for example, X and Y coordinates) that correspond to the initial position of the touch 615 on the first screen 600 from at least one of the touch screen controller 195, the first touch screen controller 195a, and the second touch screen controller 195b. Operation S502 of the present exemplary embodiment of the present inventive concept may be equivalent to operation S502 of the previous exemplary embodiment of the present inventive concept, and thus a repeated description thereof is omitted.

In operation S503 of FIG. 5, an application that corresponds to the shortcut icon may be executed.

For example, referring to a view (b) of FIG. 7, the controller 110 may execute a game application (for example, S racer 620) that corresponds to the touch 615 on the first touch screen 190a. A first screen 620a of the executed S racer 620 may display an execution screen of the game application. The controller 110 may display, for example, a racing track that corresponds to the first screen 620a on a second screen 620b. The S racer 620 application may include, for example, a game activity, a game text, a game audio source, and a game image file. Operation S504 of executing the content in the application in the previous exemplary embodiment of the present inventive concept may be included in operation S503 of the present exemplary embodiment of the present inventive concept. For example, the content executed in the previous exemplary embodiment may be executed together with the execution of the application in the present exemplary embodiment. Attribution information of the S racer application that may be the gate application may be recognized, for example, by using information in "androidmanifest.xml". If a difference between the executed application and the content is excluded, operations S503 through 507 of the present exemplary embodiment may be equivalent to operations S503 through 507 of the previous exemplary embodiment, and thus repeated descriptions thereof are omitted.

In operation S508 of FIG. 5, one audio source may be output as a sound through speakers 163 that correspond to the determined number of speakers 163.

Referring to views (b) and (c) of FIG. 7, the controller 110 may control to output one audio source as a sound through the plurality of speakers 163 (for example, a 5.1 channel) in the single output mode based on an angle (for example, 180°) between the first and second housings 100a and 100b detected by using the angle sensor 172 and a property of the executed game application (the S racer). Operation S508 of the present exemplary embodiment of the present inventive concept may be equivalent to operation of 508 of the previous exemplary embodiment of the present inventive concept, and thus a repeated description is omitted.

In operation S508 of FIG. 5 if the sound is output through the plurality of speakers 163 in the single output mode based on the angle detected by using the angle sensor 172 and the property of the executed application, the controller 110 may conclude the method.

If the output mode of the portable apparatus 100 is not the single output mode in operation S507, the controller 110 may proceed to operation S509.

If a difference between the executed application and the content is excluded, operations S509 and S510 of the present exemplary embodiment of the present inventive concept may be equivalent to operations S509 and S510 of the previous exemplary embodiment of the present inventive concept, and thus repeated descriptions thereof are omitted.

In operation S510 of FIG. 5, if the sound is output through the plurality of speakers 163 in the multi-output mode based on the angle detected by using the angle sensor 172 and the property of the executed application, the controller 110 may conclude the method.

In the previous and present exemplary embodiments of the present general inventive concept, if the detected angles are the same, and the executed applications are different from each other (for example, the executed application is the reader's hub 610 in the previous exemplary embodiment, and the executed application is the S racer game 620 in the present exemplary embodiment), at least one of output modes and the numbers of speakers 163 may be the same. For example, only the output modes may be the same, only the numbers of speakers 163 may be the same, or the output modes and the numbers of speakers 163 may be the same.

Figure 8:
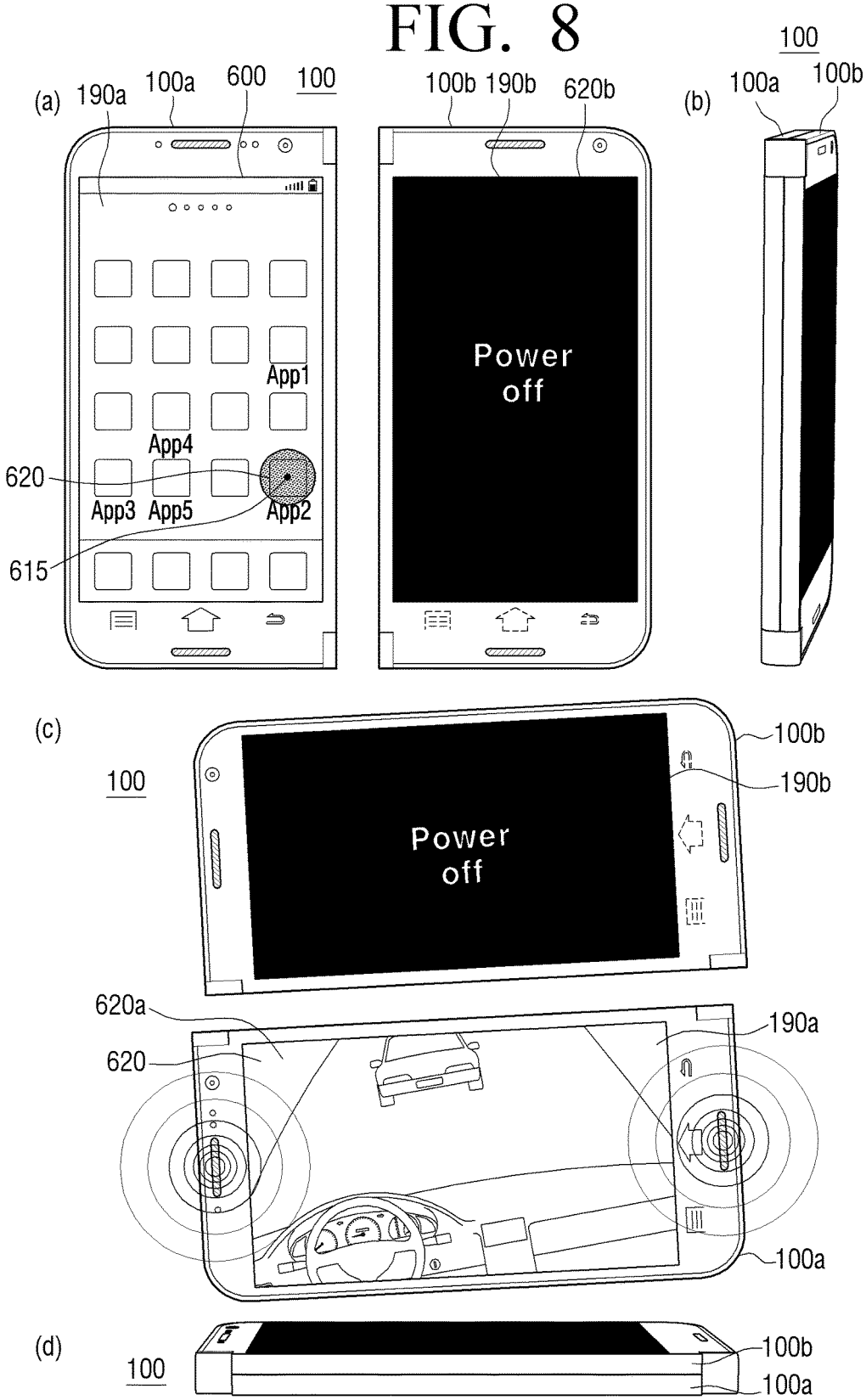
FIG. 8 includes views illustrating methods of outputting a sound of a portable apparatus according to other exemplary embodiments of the present general inventive concept.

FIG. 8 includes views illustrating a method of outputting a sound of the portable apparatus 100 according to an exemplary embodiment of the present general inventive concept.

In operation S501 of FIG. 5, one shortcut icon or a plurality of shortcut icons may be displayed on a first touch screen of a first housing.

Referring to views (a) and (b) of FIG. 8, the first screen 600 may be displayed on the first touch screen 190a. The second touch screen 190b may be turned off. The first and second housings 100a and 100b of the portable apparatus 100 may be folded as illustrated in the view (a) of FIG. 2.

Operation S501 of the present exemplary embodiment of the present inventive concept may be equivalent to operation S501 of the previous exemplary embodiment of the present inventive concept described with reference to FIGS. 6A and 6B, and thus a repeated description thereof is omitted.

In operation S502, a touch may be detected from the shortcut icon.

Referring to the view (a) of FIG. 8, a user may perform the touch 615 (for example, by a tap) of a shortcut icon for the first application 620 displayed on the first touch screen 190a. The controller 110 may detect the touch 615 of the user on the first touch screen 190a through the first touch screen 190a and at least one of the touch screen controller 195, the first touch screen controller 195a, and the second touch screen controller 195b. For example, the controller 110 may receive position information (for example, X and Y coordinates) that correspond to the initial position of the touch 615 on the first screen 600 from at least one of the touch screen controller 195, the first touch screen controller 195a, and the second touch screen controller 195b. Operation S502 of the present exemplary embodiment of the present inventive concept may be equivalent to operation S502 of the previous exemplary embodiment of the present inventive concept described with reference to FIGS. 6A and 6B, and thus a repeated description thereof is omitted.

In operation S503 of FIG. 5, an application corresponding to the shortcut icon may be executed.

For example, referring to a view (c) of FIG. 8, a game application (for example, the S racer application 620) that corresponds to the touch 615 on the first touch screen 190a. The first screen 620a of the executed S racer 620 may display the execution screen of the game application. The second screen 620b may be turned off. Operation S504 of executing the content in the application in the previous exemplary embodiment of FIGS. 6A and 6B may be included in operation S503 of the previous exemplary embodiment of FIG. 7. For example, the content executed in the previous exemplary embodiment of the present inventive concept described with reference to FIGS. 6A and 6B may be executed along with the execution of the application (for example, the game) in the previous exemplary embodiment of the present inventive concept described with reference to FIG. 7. Operations S503 and S504 of the present exemplary embodiment of the present inventive concept may be equivalent to operations S503 and S504 of the previous exemplary embodiment of the present inventive concept described with reference to FIGS. 6A and 6B, and thus repeated descriptions thereof are omitted.

In operation S505 of FIG. 5, an angle between first and second housings may be detected.

Referring to a view (b) of FIG. 8, the controller 110 may detect an angle between the first and second housings 100a and 100b by using the angle sensor 172. The angle detected between the first and second housings 100a and 100b is, for example, 0° (for example, an error of the angle includes a range of)±2°.

Operations S501 through S504 of detecting the angle between the first and second housings and is easily understood by those skilled in the art in light of the descriptions included herein.

In operation S506, the number of output speakers 163 may be determined.

The controller 110 may determine the number of output speakers 163 by using the executed application (for example, parameters corresponding to the number of output speakers 163 in the S racer application 620). The determined number of output speakers 163, for example, may be six in the present exemplary embodiment of the present inventive concept. Operations S506 and S507 of the present exemplary embodiment of the present inventive concept may be equivalent to operations S506 and S507 of the previous exemplary embodiment of the present inventive concept described with reference to FIGS. 6A and 6B, and thus repeated descriptions thereof are omitted.

In operation S508 of FIG. 5, one audio source may be output as a sound through speakers 163 corresponding to the determined number of speakers 163.

Referring to the view (c) of FIG. 8, if the detected angle is 0° and the title of the executed application is the S racer 620, the controller 110 may control, for example, the plurality of speakers 163 and a codec unit (not illustrated) to output a sound through a 2 channel and two speakers 163 in the single output mode.

The controller 110 may turn off sound outputs of four speakers 163. For example, since the detected angle is 0°, the second screen 620b may be turned off, the three speakers 163c, 163d, and 163f positioned in the second housing 100b may be turned off, the back sides of the first and second housings 100a and 100b may be folded as illustrated in the view (a) of FIG. 2, and the controller may turn off a sound output of the fifth speaker 163e positioned on the back side of the first housing 100a. For example, the controller 110 may also turn off only sound outputs of the three speakers 163c, 163d, and 163f positioned in the second housing 100a and turn on the sound output of the fifth speaker 163e, a woofer speaker, positioned on the back side of the first housing 100a. If a difference between the executed application is excluded, operation S508 of the present exemplary embodiment of the present inventive concept may be equivalent to operation S508 of the previous exemplary embodiment of the present inventive concept with reference to FIGS. 6A and 6B, and thus a repeated description thereof is omitted.

In operation S508 of FIG. 5, if a sound is output through a plurality of speakers 163 in the single output mode based on the angle detected by using the angle sensor 172 and the property of the executed application, the controller 110 may conclude the method.

In operation S507 of FIG. 5, if the output mode of the portable apparatus 100 is not the single output mode, the controller 110 may conclude the method.

For example, the controller 110 may output a plurality of audio sources as sounds through speakers 163 (for example, two speakers 163) that correspond to the determined number of speakers 163. However, if the detected angle is, for example, 0°, and the game application S racer 620 is being executed, the controller 110 may conclude the method.

In the present exemplary embodiment of the present inventive concept, a plurality of touch screens 190a and 190b and a plurality of speakers 163 may be installed. Also, sounds may be output through the plurality of speakers 163 according to an output mode that may be determined according to an angle between touch screens 190a and 190b of the plurality of touch screens 190a and 190b and one screen being in a power-off state. In the exemplary embodiments of present inventive concept illustrated in FIGS. 7 and 8, if the same applications are executed, and the detected angles are different from each other (for example, the detected angle is 180° in the exemplary embodiment illustrated in FIG. 7, and the detected angle is 0° in the exemplary embodiment illustrated in FIG. 8), at least one of output modes and the numbers of output speakers 163 may be different. For example, only the output modes may be different from each other, only the number of output speakers 163 may be different from each other, or the output modes and the numbers of output speakers 163 may be different from each other.

Figure 9:
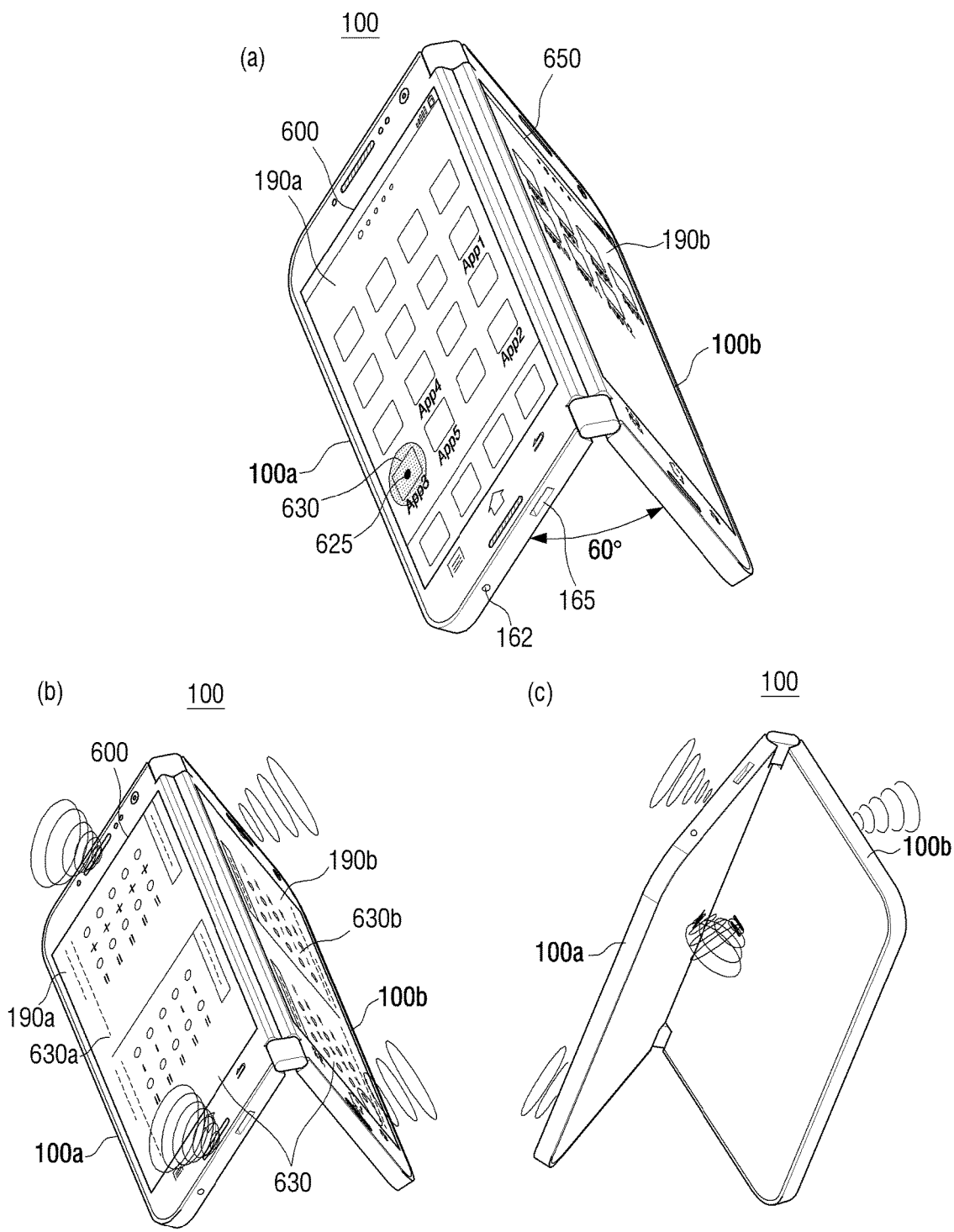
FIG. 9 includes views illustrating methods of outputting a sound of a portable apparatus according to other exemplary embodiments of the present general inventive concept.

FIG. 9 includes views illustrating a method of outputting a sound of the portable apparatus 100 according to another exemplary embodiment of the present general inventive concept.

In operation S501, one shortcut icon or a plurality of shortcut icons may be displayed on the first screen 600 of the first touch screen 190a. The second screen 650 may be displayed on the second touch screen 190b. Operation S501 of the present exemplary embodiment of the present inventive concept may be equivalent to operation S501 of the exemplary embodiment of the present inventive concept described with reference to FIGS. 6A and 6B, and thus a repeated description thereof is omitted.

In operation S502, a touch may be detected from the shortcut icon.

Referring to a view (a) of FIG. 9, a user may perform a touch 625 (for example, by a tap) of a shortcut icon for a third application 630 displayed on the first touch screen 190a. The controller 110 may detect the touch 625 of the user on the first touch screen 190a through the first touch screen 190a and at least one of the touch screen controller 195, the first touch screen controller 195a, and the second touch screen controller 195b. The controller 110 may receive, for example, position information that corresponds to the initial position of the 625 on the first screen 600 from at least one of the touch screen controller 195, the first touch screen controller 195a, and the second touch screen controller 195b. Operation S502 of the present exemplary embodiment of the present inventive concept may be equivalent to operation S502 of the exemplary embodiment of the present inventive concept described with reference to FIGS. 6A and 6B, and thus a repeated description thereof is omitted.

In operation S503 of FIG. 5, an application that corresponds to the shortcut icon may be executed.

For example, referring to a view (b) of FIG. 9, the controller 110 may execute a study application (for example, eStudy 630) that corresponds to the touch 625 on the first touch screen 190a. A first screen 630a of the executed eStudy 630 may display various types of contents (not illustrated). For example, the first screen 630a may display Elementary School First Grade Korean (not illustrated), Elementary School First Grade Mathematics (not illustrated), Elementary School First Grade Science (not illustrated), or the like.

If differences between the executed applications and contents are excluded, operation S504 of the present exemplary embodiment of the present inventive concept may be equivalent to operation S503 of the exemplary embodiment of the present inventive concept described with reference to FIGS. 6A and 6B, and thus a repeated description thereof is omitted.

In operation S504 of FIG. 5, a content may be executed in the application.

The controller 110 may detect a touch (not illustrated) of the user on the first touch screen 190a through the first touch screen 190a and at least one of the touch screen controller 195, the first touch screen controller 195a, and the second touch screen controller 195b. For example, the controller 110 may receive position information (for example, X and Y coordinates) that correspond to an initial position of the touch (not illustrated) on the first screen 600 from at least one of the touch screen controller 195, the first touch screen controller 195a, and the second touch screen controller 195b.

For example, referring to the view (b) of FIG. 9, the controller 110 may execute the content (for example, Elementary School First Grade Mathematics (not illustrated)) that corresponds to the touch (not illustrated) on the first touch screen 190a to display the first and second screens 630a and 630b, respectively, on the first and second touch screens 190a and 190b. Referring to the view (b) of FIG. 9, the first and second screens 630a and 630b, for example, may display the same screen. Alternatively, the controller 110, for example, may display different screens on the first and second screens 630a and 630b. For example, the first screen 630a may be provided for a student, and the second screen 630b may be provided for parents or a teacher.

If differences between the executed applications and contents are excluded, operation S503 of the present exemplary embodiment of the present inventive concept may be equivalent to operation S503 of the exemplary embodiment of the present inventive concept described with reference to FIGS. 6A and 6B, and thus a repeated description thereof is omitted.

In operation S505 of FIG. 5, an angle between first and second housings 100a and 100b may be detected.

Referring to the view (b) of FIG. 9, the controller 110 may detect an angle between the first and second housings 100a and 100b by using the angle sensor 172. The angle detected between the first and second housings is, for example, 60° (for example, an error of the angle includes a range of)±2°.

In operation S506 of FIG. 5, the number of output speakers 163 may be determined.

The controller 110 may determine the number of output speakers by using parameters corresponding to the number of output speakers 163 in the executed Elementary School First Grade Mathematics. The determined number of output speakers 163, for example, may be six in the present exemplary embodiment of the present inventive concept. If differences between the executed applications and contents are excluded, operation S506 of the present exemplary embodiment of the present inventive concept may be equivalent to operation S506 of the exemplary embodiment of the present inventive concept described with reference to FIGS. 6A and 6B, and thus a repeated description thereof is omitted.

In operation S507 of FIG. 5, the controller 110 may determine whether the output mode of the portable apparatus 100 is the single output mode.

Operation S507 of the present exemplary embodiment of the present inventive concept may be equivalent to operation S507 of the exemplary embodiment of the present inventive concept described with reference to FIGS. 6A and 6B, and thus a repeated description thereof is omitted. If the output mode of the portable apparatus 100 is not the single output mode, the controller 110 may proceed to operation S509.

In operation S508 of FIG. 5, the controller 110 may output one audio source as a sound through speakers 163 that correspond to the determined number of speakers 163.

For example, referring to the views (b) and (c) of FIG. 9, the portable apparatus 100 may include a total of six speakers (for example, a 5.1 channel). For example, if the detected angle is 60° and the executed study application and the executed content are Elementary School First Grade Mathematics, the controller 110 may control the plurality of speakers 163 and a codec unit (not illustrated) to output a sound through a 5.1 channel and six speakers in the single output mode. Operation S508 of the present exemplary embodiment of the present inventive concept may be equivalent to operation s508 of the exemplary embodiment of the present inventive concept described with reference to FIGS. 6A and 6B, and thus a repeated description thereof is omitted.

In operation S508 of FIG. 5, if a sound is output through a plurality of speakers 163 in the single output mode based on the angle detected by using the angle sensor 172 and the property of the executed application, the controller 110 may conclude the method.

If the output mode of the portable apparatus 100 is not the single output mode in operation S507, the controller 110 may proceed to operation S509.

In operation S509 of FIG. 5, the controller 110 may determine whether the output mode of the portable apparatus 100 is the multi-output mode.

Operation S509 of the present exemplary embodiment of the present inventive concept may be equivalent to operation S509 of the exemplary embodiment of the present inventive concept described with reference to FIGS. 6A and 6B, and thus a repeated description thereof is omitted.

In operation S509 of FIG. 5, if the determined output mode is not the multi-output mode, the controller 110 may conclude the method.

In operation S510 of FIG. 5, the controller 110 may output a plurality of audio sources as sounds through speakers 163 that correspond to the determined number of speakers 163.

For example, referring to the views (b) and (c) of FIG. 9, the controller 110 may control to output a first audio source as a sound through the three speakers 163a, 163b, and 163e positioned in the first housing 100a. In this case, the portable apparatus 100 may provide the same effect as that of outputting a sound through a 2.1 channel in the single output mode. The controller 110 may control to output a second audio source as a sound through the three speakers 163c, 163d, and 163f positioned in the second housing 100b. Even in this case, the portable apparatus 100 may provide the same effect as that of providing a sound through a 2.1 channel in the single output mode.

In operation S510 of FIG. 5, if a sound is output through the plurality of speakers 163 in the multi-output mode based on the angle detected by using the angle sensor 172 and the property of the executed application, the controller 110 may conclude the method.

According to another exemplary embodiment of the present inventive concept, if different applications are executed and the detected angles are different (for example, the detected angle is 60° in the present exemplary embodiment, and the detected angle is 180° and 0°, respectively, in the exemplary embodiment illustrated in FIG. 7 and the exemplary embodiment illustrated in FIG. 8), at least one of output modes and the numbers of output speakers 163 may be different. For example, only the output modes may be different, only the numbers of output speakers 163 may be different, and the output modes and the numbers of output speakers 163 may be different.

Figure 10:
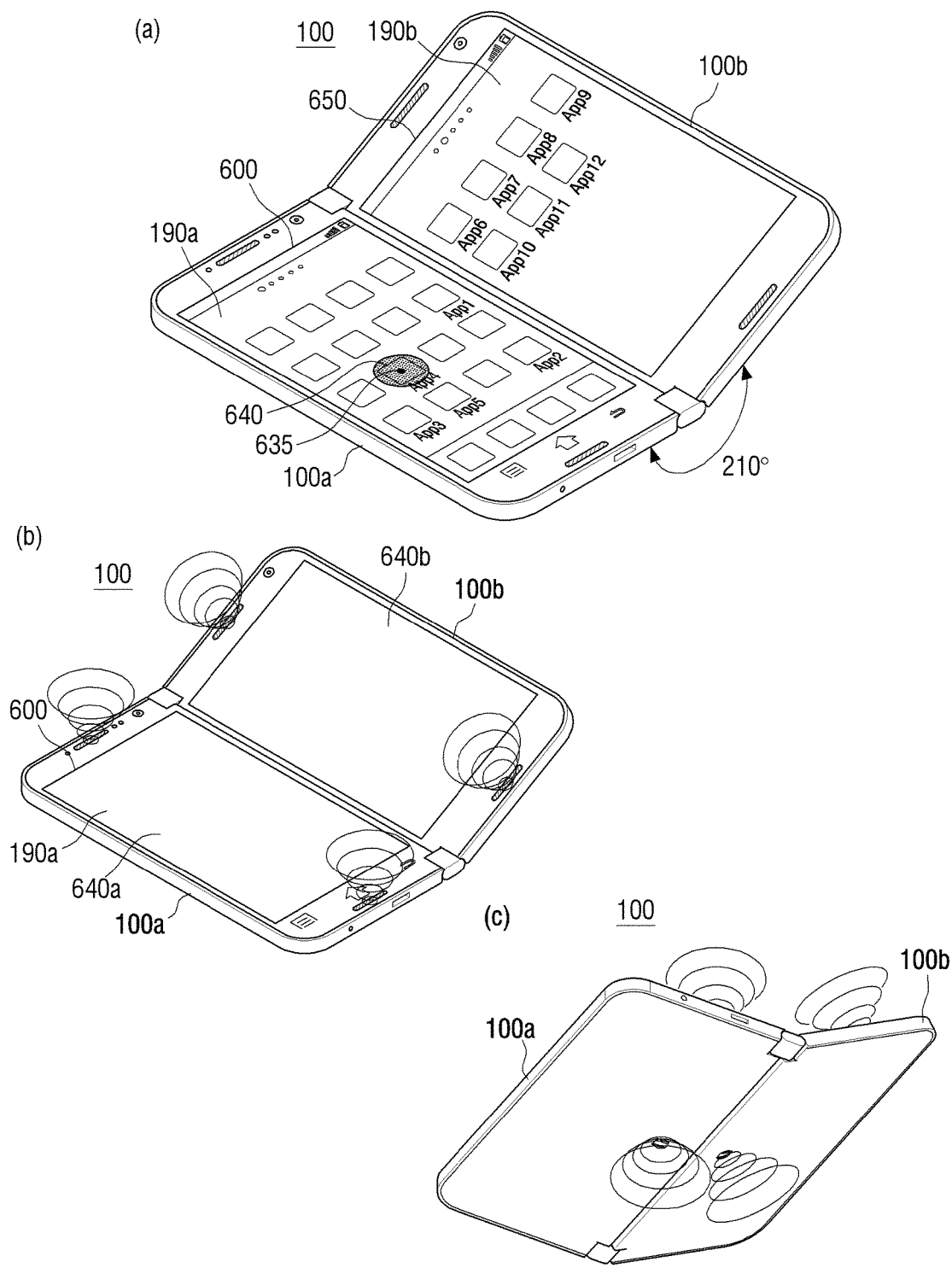
FIG. 10 includes views illustrating methods of outputting a sound of a portable apparatus according to other exemplary embodiments of the present general inventive concept.

FIG. 10 includes views illustrating a method of outputting a sound of the portable apparatus 100 according to another exemplary embodiment of the present general inventive concept.

In operation S501 of FIG. 5, one shortcut icon or a plurality of shortcut icons may be displayed on the first screen 600 of the first touch screen 190a. The second screen 650 may be displayed on the second touch screen 190b. Operation S501 of FIG. 5 in the present exemplary embodiment of the present inventive concept may be equivalent to operation S501 of FIG. 5 in the exemplary embodiment of the present inventive concept described with reference to FIGS. 6A and 6B, and thus a repeated description is omitted.

In operation S502 of FIG. 5, a touch may be detected from the shortcut icon.

Referring to a view (a) of FIG. 10, a user may perform a touch 635 (for example, by a tap) of a shortcut icon for a fourth application 640 displayed on the first touch screen 190a. The controller 110 may detect the touch 635 of the user on the first touch screen 190a through the first touch screen 190a and at least one of the touch screen controller 195, the first touch screen controller 195a, and the second touch screen controller 195b. The controller 110 may receive position information (for example, X and Y coordinates) that corresponds to the initial position of the touch 635 on the first screen 600 from at least one of the touch screen controller 195, the first touch screen controller 195a, and the second touch screen controller 195b. Operation S502 of the present exemplary embodiment of the present inventive concept may be equivalent to operation S502 of the exemplary embodiment of the present inventive concept described with reference to FIGS. 6A and 6B, and thus a repeated description thereof is omitted.

In operation S503 of FIG. 5, an application corresponding to the shortcut icon may be executed.

The controller 110 may execute a Social Networking Service (SNS) application (for example, the messenger 640) that corresponds to the touch 635 on the first touch screen 190a. The first and second screens 640a and 640b of the executed messenger 640 may display the same screen or may display one of different screens. If differences between executed applications and contents are excluded, operation S503 of the present exemplary embodiment of the present inventive concept may be equivalent to operation S503 of the exemplary embodiment of the present inventive concept described with reference to FIGS. 6A and 6B, and thus a repeated description thereof is omitted.

In operation S504 of FIG. 5, a content may be executed in the application.

The controller 110 may detect a touch (not illustrated) of the user on the first touch screen 190a through the first touch screen 190a and at least one of the touch screen controller 195, the first touch screen controller 195a, and the second touch screen controller 195b. The controller 110 may receive position information (for example, X and Y coordinates) that correspond to an initial position of the touch (not illustrated) on the first screen 600 from at least one of the touch screen controller 195, the first touch screen controller 195a, and the second touch screen controller 195b.

Referring to a view (b) of FIG. 10, the controller 110 may execute a content (for example, chatting) that corresponds to the touch (not illustrated) on the first touch screen 190a to display, respectively, the first and second screens 640a and 640b on the first and second touch screens 190a and 190b.

For example, the executed messenger 640 may display a keyboard (not illustrated) on the first screen 640a. For example, the messenger 640 may display a chatting window (not illustrated) on the second screen 640b.

If differences between executed applications and contents are excluded, operation S504 of the present exemplary embodiment of the present inventive concept may be equivalent to operation S503 of the exemplary embodiment of the present inventive concept described with reference to FIGS. 6A and 6B, and thus a repeated description is omitted.

In operation S505 of FIG. 5, an angle between the first and second housings 100a and 100b may be detected.

Referring to a view (b) of FIG. 10, the controller 110 may detect the angle between the first and second housings 100a and 100b by using the angle sensor 172. The angle detected between the first and second housings 100a and 100b is, for example, 210° (for example, an error of the angle includes a range of)±2°.

In operation S506 of FIG. 5, the number of output speakers 163 may be determined.

The controller 110 may determine the number of output speakers 163 by using parameters that correspond to the number of output speakers 163 in the executed chatting application. The determined number of output speakers 163, for example, may be six in the present exemplary embodiment of the present inventive concept. If differences between executed applications and contents are excluded, operation S506 of the present exemplary embodiment of the present inventive concept may be equivalent to operation S506 of the exemplary embodiment of the present inventive concept described with reference to FIGS. 6A and 6B, and thus a repeated description is omitted.

In operation S507 of FIG. 5, the controller 110 may determine whether the output mode of the portable apparatus 100 is the single output mode.

Operation S507 of the present exemplary embodiment of the present inventive concept may be equivalent to operation S507 of the exemplary embodiment of the present inventive concept described with reference to FIGS. 6A and 6B, and thus a repeated description thereof is omitted. If the output mode of the portable apparatus 100 is not the single output mode, the controller 110 may proceed to operation S509.

In operation S508 of FIG. 5, one audio source may be output as a sound through speakers 163 that correspond to the determined number of output speakers 163.

For example, referring to the views (a) and (b) of FIG. 10, the portable apparatus 100 may include a total of six speakers (for example, 5.1 channel). For example, if the detected angle is 210° and the executed SNS application 640 and the content is a chatting application, the controller 110 may control the plurality of speakers 164 and a codec unit (not illustrated) to output a sound through a 5.1 channel and six speakers 163 in the single output mode. Operation S508 of the present exemplary embodiment of the present inventive concept may be equivalent to operation S508 of the exemplary embodiment of the present inventive concept described with reference to FIGS. 6A and 6B, and thus a repeated description is omitted.

In operation S508 of FIG. 5, if a sound is output through a plurality of speakers 163 in the single output mode based on the angle detected by using the angle sensor 172 and the property of the executed application, the controller 110 may conclude the method.

If the output mode of the portable apparatus 100 is not the single output mode in operation S507 of FIG. 5, the controller 110 may proceed to operation S509.

In operation S509 of FIG. 5, the controller 110 may determine whether the output mode of the portable apparatus 100 is the multi-output mode.

Operation S509 of the present exemplary embodiment of the present inventive concept may be equivalent to operation S509 of the exemplary embodiment of the present inventive concept described with reference to FIGS. 6A and 6B, and thus a repeated description is omitted.

In operation S509 of FIG. 5, if the determined mode is not the multi-output mode, the controller 110 may conclude the method.

In operation S510, the controller 110 may output a plurality of audio sources as sounds through speakers 163 that correspond to the determined number of speakers 163.

For example, referring to views (b) and (c) of FIG. 10, the controller 110 may control to output a first audio source as a sound through the three speakers 163a, 163b, and 163e positioned in the first housing 10a. In this case, the portable apparatus 100 may provide the same effect as that of outputting a sound through a 2.1 channel in the single output mode. The controller 110 may control to output a second audio source as a sound through the three speakers 163c, 163d, and 163f positioned in the second housing 100b.

In operation S510 of FIG. 5, if a sound is output through the plurality of speakers 163 in the multi-output mode based on the angle detected by using the angle sensor 172 and the property of the executed application, the controller 110 may conclude the method.

According to another exemplary embodiment of the present inventive concept, if a different application is executed and the detected angle is different (for example, the detected angle is 210° in the present exemplary embodiment, and the detected angle is 180°, 0°, and 60°, respectively in the exemplary embodiment illustrated in FIG. 7, the exemplary embodiment illustrated in FIG. 8, and the exemplary embodiment illustrated in FIG. 9), at least one of output modes and the numbers of output speakers 163 may be different. For example, only the output modes may be different, only the numbers of output speakers 163 may be different, and the output modes and the numbers of output speakers 163 may be different.

Figure 11B:
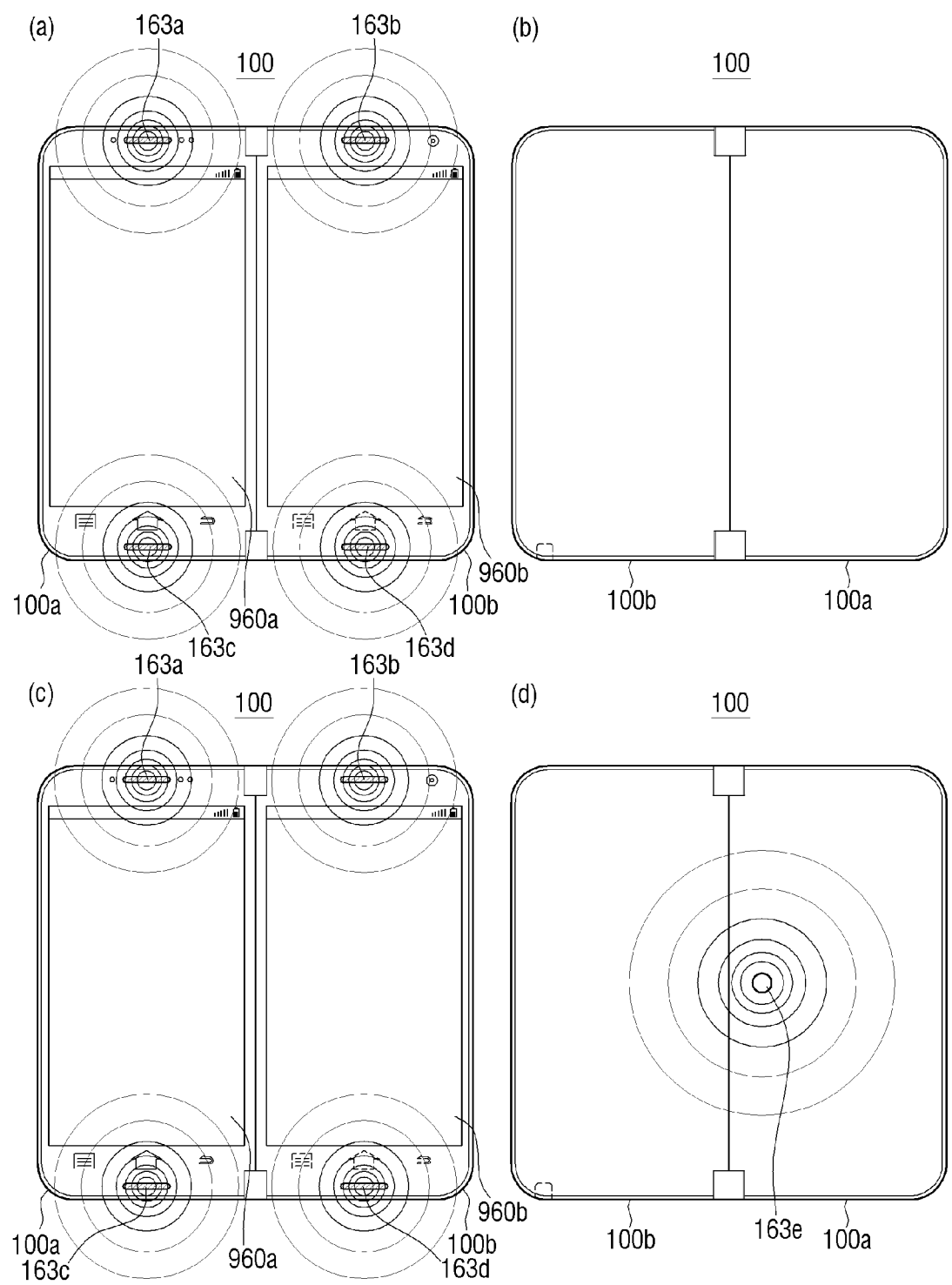

FIGS. 11A and 11B are views illustrating a method of outputting a sound of the portable apparatus 100 according to another exemplary embodiment of the present general inventive concept.

Referring to a view (a) of FIG. 11A, the portable apparatus 100 may include, for example, a total of two speakers 163a and 163b that may be positioned, respectively, on the top of the front side of the first housing 100a and on the top of the front side of the second housing 100b. Referring to a view (b) of FIG. 11A, there may be no speakers on the back sides of the first and second housings 100a and 100b.

The controller 110 may control to output a sound through a mono channel (for example, output through only one speaker 163a or 163b) or a stereo channel (for example, a 2 channel) according to an angle detected between the first and second housings 100a and 100b and executed application and content. For example, if the detected angle is 0°, an execution screen of an application is displayed on a first screen 960, and a second screen 960b is turned off, the controller 110 may control to output one audio source as a sound through one speaker 163a or 163b.

For example, if the detected angle is greater than 0° and the execution screen of the application is displayed on the first and second screens 960a and 960b, the controller 110 may control to output one audio source as a sound through two speakers 163a and 163b. Alternatively, if the detected angle is greater than 0° and the execution screen of the application is displayed on the first and second screens 960a and 960b, the controller 110 may control to output a plurality of audio sources as a mono sound through the plurality of speakers 163a and 163b.

Referring to a view (c) of FIG. 11A, the portable apparatus 100 may include, for example, a total of three speakers 163a, 163b, and 163e. Two speakers 163a and 163b of the three speakers may be positioned, respectively, on the top of the front side of the first housing 100a and on the top of the front side of the second housing 100b. Referring to a view (d) of FIG. 11A, only the fifth speaker 163e, a woofer speaker, may be positioned only on the back side of the first housing 100a.

The controller 110 may control to output a sound through the mono channel (for example, output through only one speaker 163a or 163b), the stereo channel (for example, a 2 channel), or a 2.1 channel according to the angle detected between the first and second housings 100a and 100b and the executed application and content. For example, if the detected angle is 0°, the execution screen of the application is displayed on the first screen 960a, and the second screen 960 is turned off, the controller 110 may control to output one audio source as a sound through one speaker 163a, 163b, or 163e.

For example, if the detected angle is 0° and the execution screen of the application is displayed on the first and second screens 960a and 960b, the controller 110 may control to output one audio source as a sound through three speakers 163a, 163b, and 163e. Alternatively, if the detected angle is greater than 0° and the execution screen of the application is displayed on the first and second screens 960a and 960b, the controller 110 may control to output a plurality of sources as a sound through three speakers 163a, 163b, and 163e.

Referring to a view (a) of FIG. 11B, the portable apparatus 100 may include, for example, a total of four speakers 163a, 163b, 163c, and 163d. Two speakers 163a and 163c of the four speakers may be positioned on the top and the bottom of the front side of the first housing 100a, and the other two speakers 163b and 163d may be positioned on the top and the bottom of the front side of the second housing 100b. Referring to a view (b) of FIG. 11B, there may be no speakers on the back sides of the first and second housings 100a and 100b.

The controller 110 may control to output a sound through the stereo channel (for example, a 2 channel) or two stereo channels according to the angle detected between the first and second housings 100a and 100b and the executed application and content. For example, if the detected angle is 0°, the execution screen of the application is displayed on the first screen 960a, and the second screen 960 is turned off, the controller 110 may control to output one audio source as a sound through two speakers of the speakers 163a, 163b, 163c, and 163d.

For example, if the detected angle is greater than 0° and the execution screen of the application is displayed on the first and second screens 960a and 960b, the controller 110 may control to output one audio source as a sound through the four speakers 163a, 163b, 163c, and 163d. Alternatively, if the detected angle is 0° and the execution screen of the application is displayed on the first and second screens 960a and 960b, the controller 110 may control to output a plurality of audio sources as a sound through the four speakers 163a, 163b, 163c, and 163d. For example, the controller 110 may control to output a first audio source as a sound through two speakers 163a and 163c of the first housing 100a and to output a second audio source as a sound through two speakers 163b and 163d of the second housing 100b.

Referring to a view (c) of FIG. 11B, the portable apparatus 100 may include, for example, a total of five speakers 163a, 163b, 163c, 163d, and 163e. Two speakers 163a and 163c of the five speakers may be positioned on the top and the bottom of the front side of the first housing 100a, and the another two speakers 163b and 163d of the five speakers may be positioned on the top and the bottom of the front side of the second housing 100b. Referring to a view (d) of FIG. 11B, only the fifth speaker 613e, a woofer speaker, may be positioned only on the back side of the first housing 100.

The controller 110 may control to output a sound through a 4.1 channel according to the angle detected between the first and second housings 100a and 100b and the executed application and content. For example, if the detected angle is 0°, the execution screen of the application is displayed on the first screen 960a, and the second screen 960b is turned off, the controller 110 may control to output one audio source as a sound through two speakers (a 2 channel) or three speakers (a 2.1 channel) of the speakers 163a, 163b, 163c, 163d, and 163e.

For example, if the detected angle is greater than 0° and the execution screen of the application is displayed on the first and second screens 960a and 960b, the controller 110 may control to output one audio source as a sound through the five speakers 163a, 163b, 163c, 163d, and 163e (a 4.1 channel). Alternatively, if the detected angle is 0° and the execution screen of the application is displayed on the first and second screens 960a and 960b, the controller 110 may control to output a plurality of audio sources as a sound through the five speakers 163a, 163b, 163c, 163d, and 163e. For example, the controller 110 may control to output a first audio source as a sound through three speakers 163a, 163c, and 163e of the first housing 100a and to output a second audio source as a sound through two speakers 163b and 163d of the second housing 100b.

Figure 12:
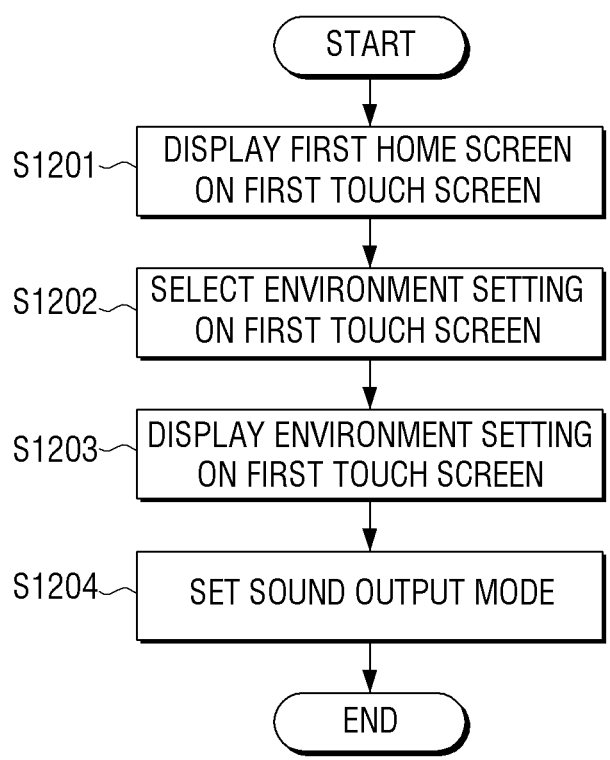
FIG. 12 is a flowchart illustrating a process of setting a sound output mode according to an exemplary embodiment of the present general inventive concept.

FIG. 12 is a flowchart illustrating a process of setting a sound according to an exemplary embodiment of the present general inventive concept.

FIG. 13 includes views illustrating a method of setting a sound output mode according to an exemplary embodiment of the present general inventive concept.

In operation S1201 of FIG. 12, a home screen may be displayed on the first or second touch screen 190a or 190b.

Referring to FIG. 1A, if a user selects the home button 161a2 of the first button group 161a positioned on the bottom of the front side of the first housing 100a, a home screen (not illustrated) may be displayed on the first touch screen 190a. If the user selects the home button 161b2 of the second button group 161b positioned on the bottom of the front side of the second housing 100b, a home screen (not illustrated) may be displayed on the second touch screen 190b. Hereinafter, operations with respect to the home buttons 161a2 and 161b2 are described with reference only to the home button 161a2 of the first touch screen 190a. It is easily understood by those skilled in the art in light of the descriptions included herein that the home button 161b2 may be configured to perform the operations described with reference to the home button 161a2.

In operation S1202 of FIG. 12, an environment setting may be selected on the first touch screen 190a.

The environment setting may be selected, for example, by a touch (not illustrated) of the user on a shortcut icon (not illustrated) that corresponds to the environment setting on the home screen (not illustrated) displayed on the first touch screen 190a. Alternatively, if the home screen is displayed, the environment setting of the menu button 161a1 may be selected by the user.

In operation S1203 of FIG. 12, the environment setting may be displayed.

A view (a) of FIG. 13 illustrates a process of displaying a screen of the environment setting according to an exemplary embodiment of the present general inventive concept.

Referring to the view (a) of FIG. 13, under control of the controller 110, the screen of the environment setting 1300 may be displayed on the first touch screen 190a. Items of the displayed screen of the environment setting 1300 may include, for example, a wireless and network 1301, a call 1302, a sound 1303, a display 1304, a security 1305, and a sound output mode setting 1306. Items displayed in screen of the environment setting 1300 may be added or removed according to a performance requirement of the portable apparatus 100.

In operation S1204 of FIG. 12, the sound output mode may be set.

A view (b) of FIG. 13 illustrates a process of setting the sound output mode according to an exemplary embodiment of the present general inventive concept.

If the sound output mode setting 1306 of the view (a) of FIG. 13 is selected from the screen of the environment setting 1300, a screen of the sound output mode setting 1306 may be displayed in the view (b) of FIG. 13.

Referring to the view (b) of FIG. 13, the screen of the sound output mode setting 1306 may include, for example, at least one of angle setting 1306a, a screen setting 1306b, a volume setting 1306c, and a single/multi-output mode setting 1306d. The angle setting 1306a may be configured to turn off an output of a speaker 163b, 163d, and/or 163f (not illustrated) of the second housing 100b if a detected angle is, for example, 0°. The screen setting 1306b may be configured to turn off an output of a speaker 163b, 163d, and/or 163f (not illustrated) of the second housing 100b if the second screen 650 is turned off. The volume setting 1306c may be configured to set a volume of a speaker in response to status information (for example, a battery low and on the phone) of the portable apparatus 100 or surrounding status information (for example, if noise measured by using a microphone is greater than a preset level of 80 db) of the portable apparatus 100. The single/multi-output mode setting 1306d may be configured to set an output mode to output a plurality of audio sources in a single output mode. Items displayed in the screen of the sound output mode setting may be added or removed according to a performance requirement supported by the portable apparatus 100.

If operation S1204 of FIG. 12 has been completed, the method may be concluded.

Methods according to exemplary embodiments of the present general inventive concept may be realized as a program command that may be executed through various types of computers to be recorded on a computer-readable medium. The computer-readable medium may include one or a combination of a program command, a data file, a data file, etc. The program command recorded on the computer-readable medium may be designed and constituted for the present general inventive concept or may be well-known to and used by a computer software manufacturer in light of the descriptions included herein.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents,

What is claimed is:

1. A method of outputting a sound of a portable apparatus having a first housing, a second housing, a plurality of speakers included in the first housing and the second housing, and a plurality of touch screens including a first touch screen and a second touch screen which are respectively included in the first housing and the second housing, the method comprising:
    detecting a touch on an icon of a plurality of icons displayed on one of the first touch screen and the second touch screen;
    executing an application corresponding to the icon which the touch is detected;
    determining an angle between the first housing and the second housing by using a sensor;
    determining on/off sound outputs for each speaker of the plurality of speakers included in the first housing and the second housing of the portable apparatus and a number of audio files available to be output from the executed application, based on the determined angle and a property of the executed application, the property of the executed application comprising at least one of a title of the executed application, a library used in the executed application, and contents executed in the executed application;
    determining one of a plurality of selectable sound output modes based on the determined on/off sound outputs for each speaker of the plurality of speakers and the determined number of audio files, the plurality of selectable sound output modes comprising:
        a single output mode that is configured to output a sound of a single audio file of the application through the plurality of speakers; and
        a multi-output mode configured to output sounds of a plurality of audio files of the application, respectively, through different speakers based on the multi-output mode; and
    outputting, by a processor, a sound through a plurality of speakers included in the first housing and the second housing of the portable apparatus that are configured to be turned on according to the determined one of a plurality of selectable sound output modes.

2. The method of claim 1, wherein the determined angle between the first housing and the second housing is a range between about 0° and about 360°.

3. The method of claim 1, wherein at least one of:
the on/off of sound outputs;
a volume; and
an audio source to be output,
for each speaker of the plurality of speakers is controlled by the processor, according to the determined one of a plurality of sound output modes, to output the sound.

4. The method of claim 1, wherein the processor is configured to control a turn on/off of the plurality of speakers based on at least one sound setting of:
a 2 channel;
a 2.1 channel;
a 4 channel;
a 5.1 channel; and
a 7.1 channel,
of the determined one of a plurality of sound output modes.

5. The method of claim 1, further comprising:
displaying a content of the executed application on one of the first touch screen and the second touch screen,
wherein a sound corresponding to the content of the executed application is output through the plurality of speakers.

6. The method of claim 1, further comprising:
displaying a plurality of contents of the executed application, respectively, on the first touch screen and the second touch screen,
wherein a plurality of sounds corresponding to the plurality of contents of the executed application are output through different speakers.

7. A method of outputting a sound of a portable apparatus having a first housing, a second housing, a plurality of speakers included in the first housing and the second housing, and a plurality of touch screens including a first touch screen and a second touch screen, the method comprising:
detecting a touch on an icon of a plurality of icons displayed on one of the first touch screen and the second touch screen;
executing an application corresponding to the icon which the touch is detected;
determining an angle between the first touch screen and second touch screen respectively included in the first housing and the second housing;
determining on/off sound outputs for each speaker of the plurality of speakers included in the first housing and the second housing of the portable apparatus and a number of audio files available to be output from the executed application, based on the determined angle and a property of the executed application, the property of the executed application comprising at least one of a title of the executed application, a library used in the executed application, and contents executed in the executed application;
determining one of a plurality of selectable sound output modes based on the determined on/off sound outputs for each speaker of the plurality of speakers and the determined number of audio files, the plurality of sound output modes comprising:
a single output mode that is configured to output a sound of a single audio file of the executed application through the plurality of speakers; and
a multi-output mode configured to output sounds of a plurality of audio files of the executed application, respectively, through different speakers based on the multi-output mode; and
outputting a sound through the plurality of speakers included in the first housing and the second housing of the portable apparatus according to the determined one of a plurality of selectable sound output modes.

8. The method of claim 7, wherein the housing is a flexible housing.

9. A portable apparatus, comprising:
a plurality of speakers;
a first touch screen configured to display a plurality of icons corresponding to a plurality of applications, respectively;
a second touch screen;
a sensor configured to determine an angle between the first touch screen and the second touch screen;
a first housing comprising the first touch screen and at least one first speaker of the plurality of speakers;
a second housing comprising the second touch screen and at least one second speaker of the plurality of speakers; and
a processor configured to control the plurality of speakers, the first touch screen, the second touch screen, and the sensor,
wherein when the processor detects a touch on one of the plurality of icons displayed on the first touch screen, the processor executes the application corresponding to the one icon which the touch is detected, determines on/off sound outputs for each speaker of the plurality of speakers included in the first housing and the second housing and a number of audio files available to be output from the executed application, based on the determined angle and a property of the executed application, the property of the executed application comprising at least one of a title of the executed application, a library used in the executed application, and contents executed in the executed application, determines one of a plurality of selectable sound output modes based on the determined on/off sound outputs for each speaker of the plurality of speakers included in the portable apparatus and the determined number of audio files, the sound output mode comprising:
a single output mode that is configured to output a sound of a single audio file of the application through the plurality of speakers; and
a multi-output mode configured to output sounds of a plurality of audio files of the application, respectively, through different speakers based on the multi-output mode, and controls the plurality of speakers to output a sound according to the determined one of a plurality of selectable sound output modes.

10. The portable apparatus of claim 9, further comprising a hinge configured to connect the first housing and the second housing.

11. The portable apparatus of claim 10, wherein the sensor is positioned in at least one of the first housing, the second housing, and the hinge.

12. The portable apparatus of claim 10, wherein the processor is configured to control at least one of on/off of:
the on/off of sound outputs of the plurality of speakers;
a volume; and
an audio file to be output,
for each speaker of the plurality of speakers according to the determined one of a plurality of sound output modes.

13. The portable apparatus of claim 10, wherein at least one of the plurality of speakers is positioned on at least one of a front side and a back side of the first housing.

14. The portable apparatus of claim 10, wherein at least one of the plurality of speakers is positioned on at least one of a front side and a back side of the second housing.

15. The portable apparatus of claim 10, wherein at least one of the plurality of speakers are positioned on at least one of a side of the first housing and a side of the second housing,
wherein the side of the first housing connects a front side of the first housing comprising the first touch screen to a back side of the first housing, and the side of the second housing connects a front side of the second housing comprising the second touch screen to a back side of the second housing.

16. The portable apparatus of claim 10, wherein the plurality of speakers comprise at least one of a woofer speaker and a center speaker,
wherein the center speaker is positioned in a center area between both sides of the first housing, and the woofer speaker is positioned between a side of the first housing and the center speaker.

17. The portable apparatus of claim 10, wherein the plurality of speakers comprise a woofer speaker and a center speaker,
wherein the center speaker is positioned in a first one of the first housing and the second housing, the woofer speaker is positioned in a second one of the first housing and the second housing, and the first one of the first housing and the second housing different from the second one of the first housing and the second housing.

18. The portable apparatus of claim 9,
wherein the housing is a flexible housing without a hinge connecting the first touch screen and the second touch screen.

19. A method of outputting a sound of a portable apparatus having a first housing, a second housing, a plurality of touch screens including a first touch screen and a second touch screen, and a plurality of speakers, the method comprising:
detecting a touch on an icon of a plurality of icons displayed on the first touch screen;
executing an application corresponding to the icon which the touch is detected;
determining an angle between the first housing and the second housing which is separated from the first housing, the first housing comprising the first touch screen and at least one first speaker included in the plurality of speakers the second housing comprising a second touch screen and at least one second speaker;
determining on/off sound outputs for each speaker of the plurality of speakers included in the first housing and the second housing of the portable apparatus to output the sound and a number of audio files available to be output from the executed application based on the angle and a property of the executed application, the property of the executed application comprising at least one of a title of the executed application, a library used in the executed application, and contents executed in the executed application; and
outputting a sound according to a determined sound output mode of a plurality of selectable sound output modes based on the determined on/off sound outputs for each speaker of the plurality of speakers included in the portable apparatus and the determined number of audio files, the plurality of selectable sound output modes comprising:
a single output mode that is configured to output a sound of a single audio file of the executed application through the plurality of speakers; and
a multi-output mode configured to output sounds of a plurality of audio files of the executed application, respectively, through different speakers based on the multi-output mode.

20. A portable apparatus, comprising:
a plurality of speakers;
a first touch screen configured to display a plurality of icons corresponding to a plurality of applications, respectively;
a second touch screen;
a sensor configured to detect an angle between the first touch screen and the second touch screen;
a first housing comprising the first touch screen and at least one first speaker of the plurality of speakers;
a second housing separated from the first housing and comprising the second touch screen and at least one second speaker of the plurality of speakers;
a hinge configured to connect the first housing to the second housing; and
a processor configured to control the at least one first speaker of the plurality of speakers, the at least one second speaker of the plurality of speakers, the first touch screen, the second touch screen, and the sensor,
wherein when the processor detects a touch on an icon on the first touch screen, the processor executes the application corresponding to the icon which the touch is detected, determines on/off sound outputs for each speaker of the plurality of speakers included in the first housing and the second housing of the portable apparatus and a number of audio files available to be output from the executed application based on the angle and a property of the application, the property of the executed application comprising at least one of a title of the executed application, a library used in the executed application, and contents executed in the executed application, and outputs a sound through at least one of the at least one first speaker and the at least one second speaker according to a sound output mode determined from a plurality of selectable sound output modes based on the determined on/off sound outputs included in the portable apparatus and the determined number of audio files, the plurality of selectable sound output modes comprising:
a single output mode that is configured to output a sound of a single audio file of the executed application through the plurality of speakers; and
a multi-output mode configured to output sounds of a plurality of audio files of the executed application, respectively, through different speakers based on the multi-output mode.

21. A method of outputting a sound of a portable apparatus having a first housing, a second housing, a plurality of speakers included in the first housing and the second housing, the plurality of speakers including at least one first speaker included in the first housing and at least one second speaker included in the second housing, and a plurality of touch screens including a first touch screen and a second touch screen which are respectively included in the first housing and the second housing, the method comprising:
detecting a touch on an icon of a plurality of icons displayed on the first touch screen;

executing an application corresponding to the icon which the touch is detected; and determining on/off sound outputs for the at least one first speaker and the at least one second speaker of the plurality of speakers respectively included in the first housing and second housing of the portable apparatus to output the sound and a number of audio files available to be output from the executed application, based on an angle between the first housing and the second housing and a property of the executed application, the property of the executed application comprising at least one of a title of the executed application, a library used in the executed application, and contents executed in the executed application;

outputting a sound according to a sound output mode determined from a plurality of selectable sound output modes, based on the determined on/off sound outputs for the at least one first speaker and the at least one second speaker and the determined number of audio files, the plurality of sound output modes comprising:
- a single output mode that is configured to output a sound of a single audio file of the application through the plurality of speakers; and
- a multi-output mode configured to output sounds of a plurality of audio files of the application, respectively, through different speakers based on the multi-output mode.

22. The method of claim 21, wherein the angle is determined by using one of an angle sensor installed in the portable apparatus and an input received from a user.

* * * * *